US011985616B2

(12) United States Patent
Kang et al.

(10) Patent No.: US 11,985,616 B2
(45) Date of Patent: May 14, 2024

(54) METHOD AND DEVICE FOR INDICATING SYNCHRONIZATION SIGNAL BLOCK IN WIRELESS COMMUNICATION SYSTEM

(71) Applicant: Samsung Electronics Co., Ltd., Gyeonggi-do (KR)

(72) Inventors: Jinkyu Kang, Gyeonggi-do (KR); Youngbum Kim, Gyeonggi-do (KR); Taehyoung Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 51 days.

(21) Appl. No.: 17/266,287

(22) PCT Filed: Aug. 8, 2019

(86) PCT No.: PCT/KR2019/010006
§ 371 (c)(1),
(2) Date: Feb. 5, 2021

(87) PCT Pub. No.: WO2020/032645
PCT Pub. Date: Feb. 13, 2020

(65) Prior Publication Data
US 2021/0306967 A1    Sep. 30, 2021

(30) Foreign Application Priority Data
Aug. 9, 2018  (KR) .......................... 10-2018-0093397

(51) Int. Cl.
*H04W 56/00*  (2009.01)
*H04W 72/0446*  (2023.01)
*H04W 72/1273*  (2023.01)

(52) U.S. Cl.
CPC ... *H04W 56/0015* (2013.01); *H04W 72/0446* (2013.01); *H04W 72/1273* (2013.01)

(58) Field of Classification Search
CPC ......... H04W 56/0015; H04W 72/0446; H04W 72/1273; H04J 11/0073; H04J 11/0076;
(Continued)

(56) References Cited

U.S. PATENT DOCUMENTS 11,394,596 B2    7/2022  Gao et al.
2018/0184391 A1  6/2018  Ly et al.
(Continued)

FOREIGN PATENT DOCUMENTS

WO    WO 2018/028347    2/2018

OTHER PUBLICATIONS

Motorola Mobility, Lenovo, "Discussion on SS Block Transmission", R1-1705549, 3GPP TSG RAN WG1 Meeting #88bis, Apr. 3-7, 2017, 4 pages.
(Continued)

*Primary Examiner* — Chirag G Shah
*Assistant Examiner* — Joshua Smith
(74) *Attorney, Agent, or Firm* — The Farrell Law Firm, P.C.

(57) ABSTRACT

The disclosure provides a method of providing synchronization signal block indication information in a wireless communication system, the method including: configuring the synchronization signal block indication information, based on information regarding an uplink-downlink slot configuration and a subcarrier spacing at which a synchronization signal block is transmitted; transmitting the configured synchronization signal block indication information to a terminal; and transmitting at least one synchronization signal block, based on the configured synchronization signal block indication information.

4 Claims, 26 Drawing Sheets

(58) Field of Classification Search
CPC ... H04J 11/0086; H04J 11/0069; H04L 5/005; H04L 5/0053; H04L 5/0094; H04L 5/0007; H04L 27/26025; H04L 27/2655; H04L 27/2657; H04L 27/2666

See application file for complete search history.

(56) References Cited

U.S. PATENT DOCUMENTS

| | | | |
|---|---|---|---|
| 2019/0149257 A1* | 5/2019 | Jiang | H04L 5/0094 370/342 |
| 2019/0149384 A1* | 5/2019 | Kim | H04L 27/2666 370/328 |
| 2020/0053671 A1* | 2/2020 | Kim | H04W 56/0015 |
| 2020/0099493 A1* | 3/2020 | Ko | H04W 56/001 |
| 2020/0229113 A1* | 7/2020 | Yoon | H04W 56/0015 |
| 2020/0322199 A1* | 10/2020 | Matsumura | H04W 72/085 |
| 2020/0374837 A1* | 11/2020 | Harada | H04W 56/001 |
| 2021/0058206 A1* | 2/2021 | Ye | H04L 5/0053 |
| 2021/0144601 A1* | 5/2021 | Kazmi | H04W 56/001 |
| 2021/0235417 A1* | 7/2021 | Dahlman | H04W 56/001 |
| 2021/0306198 A1* | 9/2021 | Gao | H04W 56/0015 |
| 2021/0337488 A1* | 10/2021 | Baldemair | H04W 56/001 |

OTHER PUBLICATIONS

Sharp, "Indication of Actually Transmitted SS Blocks", R1-1713325, 3GPP TSG RAN WG1 #90 Meeting, Aug. 21-25, 2017, 5 pages.

LG Electronics, "Remaining Issues on SS Block Design and Indication Method", R1-1713121, 3GPP TSG RAN WG1 Meeting #90, Aug. 21-25, 2017, 8 pages.

Nokia et al., "On Requirements and Design of SS Burst Set and SS Block Index Indication", R1-1703092, 3GPP TSG-RAN WG1 Meeting #88, Feb. 13-17, 2017, 14 pages.

International Search Report dated Nov. 21, 2019 issued in counterpart application No. PCT/KR2019/010006, 20 pages.

Korean Office Action dated Jun. 7, 2023 issued in counterpart application No. 10-2018-0093397, 6 pages.

* cited by examiner

FIG. 14
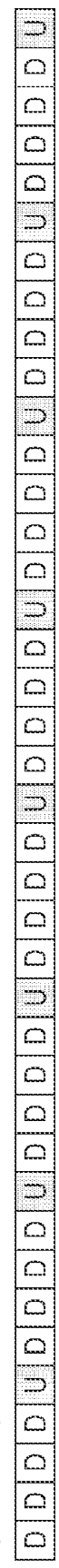
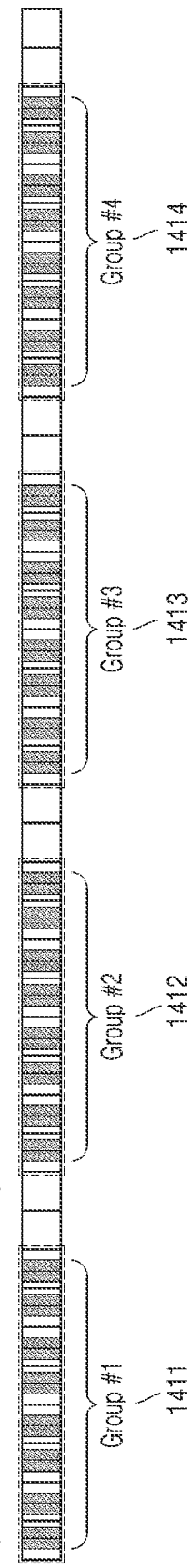

FIG. 16
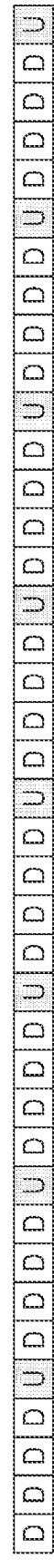
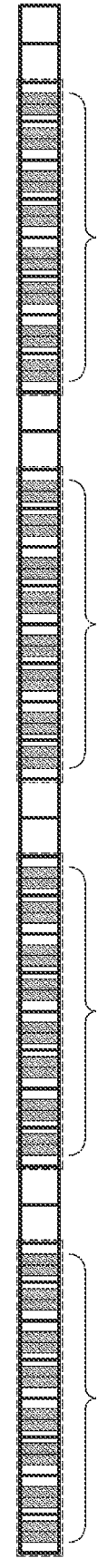
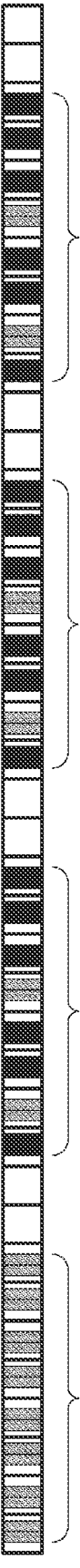

METHOD AND DEVICE FOR INDICATING SYNCHRONIZATION SIGNAL BLOCK IN WIRELESS COMMUNICATION SYSTEM

PRIORITY

This application is a National Phase Entry of PCT International Application No. PCT/KR2019/010006, which was filed on Aug. 8, 2019, and claims priority to Korean Patent Application No. 10-2018-0093397, which was filed on Aug. 9, 2018, the entire content of each of which is incorporated herein by reference.

TECHNICAL FIELD

The disclosure relates to a wireless communication system, and a method by which a base station indicates a transmitted synchronization signal block to a terminal.

BACKGROUND ART

To meet the increasing demand with respect to wireless data traffic after the commercialization of 4th generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. To achieve high data transmission rates, implementation of 5G communication systems in an ultra-high frequency (mmWave) band (e.g., a 60-GHz band) is being considered. To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans create and consume information to the Internet of things (IoT) whereby distributed elements such as objects exchange information with each other to process the information. Internet-of-Everything (IoE) technology is also emerging, in which big data processing technology is combined with IoT technology via a cloud server or the like. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to create new value in human life. As existing information technology (IT) and various industries converge and combine with each other, the IoT is applicable to various fields such as smart homes, smart buildings, smart cities, smart cars or connected cars, smart grids, health care, smart home appliances, and advanced medical services.

Various attempts are being made to apply 5G communication systems to the IoT network. For example, technologies such as sensor networks, M2M communication, MTC, or the like are being implemented by using 5G communication technologies such as beamforming, MIMO, array antennas, or the like. Application of a cloud RAN as the above-described big data processing technology may be an example of convergence of 5G communication technology and IoT technology.

As a variety of services can be provided owing to the development of mobile communication systems as described above, a method of effectively providing such services is required.

DESCRIPTION OF EMBODIMENTS

Technical Problem

Embodiments of the disclosure set forth herein provide are directed to providing a device and method for effectively providing a service in a mobile communication system.

Solution to Problem

Embodiments of the disclosure set forth herein are directed to providing a device and method for effectively providing a service in a mobile communication system.

Advantageous Effects of Disclosure

Embodiments of the disclosure set forth herein are directed to providing a device and method for effectively providing a service in a mobile communication system.

BRIEF DESCRIPTION OF DRAWINGS

FIG. 14 is a diagram illustrating determination of the number of groups of synchronization signal blocks and the number of synchronization signal blocks according to some embodiments of the disclosure.

FIG. 16 is a diagram illustrating a method of identifying an actually transmitted synchronization signal block according to some embodiments of the disclosure.

BEST MODE

Figure 1:
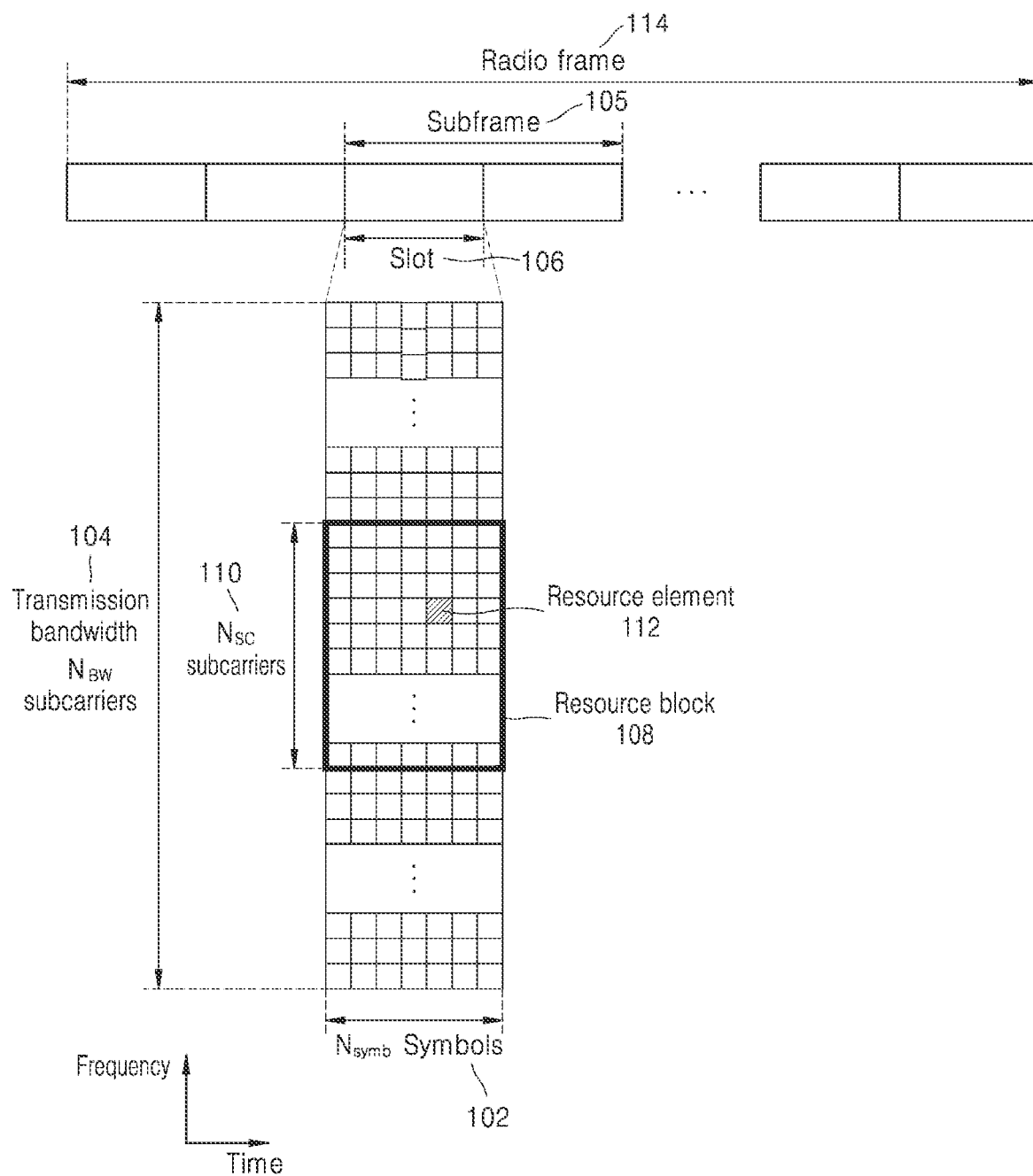
FIG. 1 is a diagram illustrating a basic structure of a time-frequency resource region of an LTE or LTE-A system, which is a radio resource domain in which data or a control channel is transmitted, according to some embodiments of the disclosure.

According to an embodiment of the disclosure, a method, performed by a base station, of providing synchronization signal block indication information in a wireless communication system includes: configuring the synchronization signal block indication information, based on information regarding an uplink-downlink slot configuration and a subcarrier spacing at which a synchronization signal block is transmitted; transmitting the configured synchronization signal block indication information to a terminal; and transmitting at least one synchronization signal block, based on the configured synchronization signal block indication information.

The configuring of the synchronization signal block indication information may include dividing a plurality of synchronization signal blocks to be transmitted in a half frame into at least one group, based on a repetition period of the uplink-downlink slot configuration and a repetition period of a pattern of a slot in which the at least one synchronization signal block is transmitted, wherein the repetition period of the slot pattern is determined according to the subcarrier spacing; and configuring the synchronization signal block indication information according to the at least one group and whether a plurality of synchronization signal blocks included in the at least one group are transmitted The synchronization signal block indication information may include a first type information bit indicating whether the plurality of synchronization signal blocks included in the at least one group are transmitted; and a second type information bit indicating whether synchronization signal blocks each corresponding to one of the at least one group is transmitted.

The synchronization signal block indication information may include a first type information bit indicating whether the plurality of synchronization signal blocks of the at least one group are transmitted; and a second type information bit to be used to identify a pattern of the first type information bit.

The configuring of the synchronization signal block indication information may include configuring the synchronization signal block indication information, based on a ratio between the subcarrier spacing at which the synchronization signal block is transmitted and a subcarrier spacing to which the uplink-downlink slot configuration is allocated.

According to another embodiment of the disclosure, a method, performed by a terminal, of providing a synchronization signal block in a wireless communication system includes: receiving information regarding an uplink-downlink slot configuration and synchronization signal block indication information from a base station; identifying the synchronization signal block indication information, based on a subcarrier spacing at which a synchronization signal block is transmitted and the information regarding the uplink-downlink slot configuration; and receiving at least one synchronization signal block, based on the identified synchronization signal block indication information.

The synchronization signal block indication information may include a bit indicating whether each of at least one group is transmitted and a bit indicating whether a plurality of synchronization signal blocks included in the at least one group are transmitted, based on a repetition period of the uplink-downlink slot configuration and a repetition period of a pattern of a slot in which the synchronization signal block determined according to the subcarrier spacing is transmitted, and the at least one group may be at least one group into which a plurality of synchronization signal blocks to be transmitted in a half frame are divided.

The synchronization signal block indication information may include a first type information bit indicating whether the plurality of synchronization signal blocks included in the at least one group are transmitted; and a second type information bit indicating whether synchronization signal blocks each corresponding to one of the at least one group is transmitted.

The synchronization signal block indication information may include a first type information bit indicating whether the plurality of synchronization signal blocks of the at least one group are transmitted; and a second type information bit to be used to identify a pattern of the first type information bit.

The synchronization signal block indication information may be configured based on a ratio between the subcarrier spacing at which the synchronization signal block is transmitted and a subcarrier spacing to which the uplink-downlink slot configuration is allocated.

According to another embodiment of the disclosure, a base station, which provides synchronization signal block indication information in a wireless communication system, includes a transceiver; and a controller coupled to the transceiver and configured to configure the synchronization signal block indication information, based on information regarding an uplink-downlink slot configuration and a subcarrier spacing at which a synchronization signal block is transmitted, transmit the configured synchronization signal block indication information to a terminal, and transmit at least one synchronization signal block, based on the configured synchronization signal block indication information.

The controller may be further configured to: divide a plurality of synchronization signal blocks to be transmitted in a half frame into at least one group, based on a repetition period of the uplink-downlink slot configuration and a repetition period of a pattern of a slot in which the at least one synchronization signal block is transmitted, wherein the repetition period of the slot pattern is determined according to the subcarrier spacing, and configure the synchronization signal block indication information according to the at least one group and whether a plurality of synchronization signal blocks included in the at least one group are transmitted.

The synchronization signal block indication information may include a first type information bit indicating whether the plurality of synchronization signal blocks included in the at least one group are transmitted; and a second type information bit indicating whether synchronization signal blocks each corresponding to one of the at least one group is transmitted.

The synchronization signal block indication information may include a first type information bit indicating whether the plurality of synchronization signal blocks of the at least one group are transmitted; and a second type information bit to be used to identify a pattern of the first type information bit.

According to another embodiment of the disclosure, a terminal, which receives a synchronization signal block in a wireless communication system, includes a transceiver; and a controller coupled to the transceiver and configured to receive information regarding an uplink-downlink slot configuration and synchronization signal block indication information from a base station, identify the synchronization signal block indication information, based on a subcarrier spacing at which a synchronization signal block is transmitted from the base station and the information regarding the uplink-downlink slot configuration, and receive at least one synchronization signal block, based on the identified synchronization signal block indication information.

MODE OF DISCLOSURE

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numerals are allocated to the same or corresponding elements in each drawing.

Terms to be described below should be defined in consideration of functions of the disclosure but may be variable depending on the intention of users or operators, practices, or the like. Therefore, the terms should be defined based on the whole context of the disclosure.

Advantages and features of the disclosure and methods of achieving them will be apparent from embodiments of the disclosure described in detail below, in conjunction with the accompanying drawings. However, the disclosure is not limited to the embodiments of the disclosure below and may be embodied in many different forms. Rather, the embodiments of the disclosure are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card.

Hereinafter, a base station refers to a subject that allocates a resource to a terminal, and may include at least one of a node B, a base station (BS), an eNode B (eNB), a gNode B (gNB), a radio access unit, a base station controller, or a node in a network. Examples of a terminal may include a user equipment (UE), a mobile station (MS), a cellular phone, a smartphone, a computer, a multimedia system capable of performing a communication function, or the like. Embodiments of the disclosure to be described below are applicable to other communication systems having a similar technical background or channel type to the embodiments of the disclosure. Embodiments of the disclosure may be applied to other communication systems through some modifications by those of skilled in the art without greatly departing from the scope of the disclosure.

In order to handle the recent explosion of mobile data traffic, a 5$^{th}$ Generation (5G) system or new radio access technology (NR), which is a next-generation communication system after Long-Term Evolution (LTE) (or Evolved Universal Terrestrial Radio Access (E-UTRA)) and LTE-Advanced (LTE-A) (or E-UTRA Evolution), is actively being discussed. Existing mobile communication systems are focused on general voice/data communication, whereas the 5G system is aimed to satisfy various services, such as enhanced Mobile BroadBand (eMBB) service, an Ultra Reliable and Low-Latency Communication (URLLC) service, a massive Machine Type Communication (MTC) service supporting mass Machine-to-Machine (M2M) communication, etc. and requirements to improve the existing voice/data communication.

A bandwidth of a system transmission band per single carrier of existing LTE and LTE-A is limited to a maximum of 20 MHz, whereas the 5G system is mainly aimed to provide ultra-high-speed data services up to several Gbps using an ultra-wide bandwidth much wider than 20 MHz. Accordingly, in the 5G system, an ultra-high frequency band of up to 100 GHz from several GHz at which an ultra-wide bandwidth frequency is relatively easy to secure is considered as a candidate frequency. In addition, securing a broadband frequency for the 5G system by relocating or allocating frequencies among frequency bands from several hundreds of MHz to several GHz, which are used in existing mobile communication systems, is considered.

As another requirement for the 5G system, an ultra-low latency service with a transmission delay of about 1 ms or less between a transmitting side and a receiving side is required. One way to reduce a transmission delay is to design a frame structure based on a shorter Transmission Time Interval (TTI) than that of LTE and LTE-A. The TTI is a basic time unit for scheduling, and a TTI of an existing LTE or LTE-A systems is 1 ms corresponding to a length of one subframe. For example, as a short TTI to satisfy requirements for ultra-low delay services of the 5G system may be 0.5 ms, 0.2 ms, 0.1 ms or the like, which are shorter than a TTI of the existing LTE or LTE-A system. A frame structure of an LTE or LTE-A system will be described with reference to the accompanying drawings, and a design concept of a 5G system will be described below.

The disclosure provides a method of indicating an efficient synchronization signal block actually transmitted in a mobile communication system, in which this method is defined to maximize and efficiently operate the number of synchronization signal blocks to be transmitted by a system or a node to transmit a downlink transmission.

Hereinafter, the disclosure describes a method of transmitting and receiving actual transmitted synchronization signal block indicator information, performed by a wireless communication system, and particularly, a system and a node for transmitting a synchronization signal block signal or a node for receiving a synchronization signal block signal.

FIG. 1 is a diagram illustrating a basic structure of a time-frequency resource region of an LTE or LTE-A system, which is a radio resource domain in which data or a control channel is transmitted, according to some embodiments of the disclosure.

In FIG. 1, the horizontal axis represents a time domain and the vertical axis represents a frequency domain. An uplink (UL) refers to a radio link through which a terminal transmits data or a control signal to a base station, and a downlink (DL) refers to a radio link through which the base station transmits data or a control signal to the terminal. In a time domain of existing LTE and LTE-A systems, a minimum transmission unit is an Orthogonal Frequency Division Multiplexing (OFDM) symbol in the case of a downlink and is a Single Carrier-Frequency Division Multiple Access (SC-FDMA) symbol in the case of an uplink. $N_{symb}$ symbols 102 form one slot 106, and two slots form one subframe 105. A length of the slot 106 is 0.5 ms and a length of each subframe is 1.0 ms. A radio frame 114 is a time domain unit including ten subframes. In a frequency domain, a minimum transmission unit is a subcarrier of 15 kHz (subcarrier spacing=15 kHz), and a bandwidth of the entire system transmission band may include a total of $N_{BW}$ (104) subcarriers.

A basic unit of a resource in the time-frequency domain is a resource element (RE) 112 and may be represented by an OFDM symbol or an OFDM symbol index and a subcarrier index. A resource block (RB) (or a physical resource block (PRB)) 108 is defined as $N_{symb}$ consecutive OFDM symbols 102 in the time domain and as $N_{RB}$ (110) consecutive subcarriers in the frequency domain. Therefore, one RB 108 includes ($N_{symb} \times N_{RB}$) REs 112. In the LTE and LTE-A systems, data is mapped in units of RBs, and a base station performs scheduling for a certain terminal in units of RB-pairs constituting one subframe. The number of SC-FDMA symbols or the number of OFDM symbols $N_{symb}$ is determined by the length of a cyclic prefix (CP) added to each symbol to prevent intersymbol interference. For example, $N_{symb}=7$ when a general CP is applied, and $N_{symb}=6$ when an extended CP is applied. The extended CP may be applied to a system having a relatively longer radio transmission distance than a general CP to maintain orthogonality between symbols.

According to some embodiments of the disclosure, subcarrier spacing, a length of a CP, etc. are essential information for OFDM transmission/reception and may be smoothly transmitted or received only when a base station and a terminal identify them as common values.

$N_{BW}$ (104) and $N_{RB}$ (110) are proportional to a bandwidth of a system transmission band. A data rate increases in proportion to the number of RBs scheduled for the terminal.

The frame structures of the LTE and LTE-A systems described above are designed in consideration of general voice/data communication, and scalability is limited in satisfying various services and requirements like a 5G system. Therefore, in the 5G system, it is necessary to flexibly define and operate a frame structure in consideration of various services and requirements.

For example, it may be considered that each service has a different subcarrier spacing according to requirements. In a current 5G communication system, a method of supporting a plurality of subcarrier spacings may be determined using Equation 1 below.

$$\Delta f = f_0 2^\mu \qquad \text{[Equation 1]}$$

Here, $f_0$ denotes a basic subcarrier spacing of the system, and $\mu$ denotes an integer scaling factor. For example, when $f_0$ is 15 kHz, a subcarrier spacing set that the 5G communication system may consist of 15 kHz, 30 kHz, 60 kHz, 120 kHz, 240 kHz, and the like. An available subcarrier spacing set may vary according to a frequency band. For example, 15 kHz, 30 kHz, and 60 kHz may be available in a frequency band of 6 GHz or less, and 60 kHz, 120 kHz, 240 kHz, and 480 kHz may be available in a frequency band above 6 GHz.

FIGS. 2, 3, 4, 5, and 6 illustrate examples of an extended frame structure. In the examples of FIGS. 2, 3, 4, 5, and 6, a set of essential parameters defining an extended frame structure may include a subcarrier spacing, a length of a CP, a slot length, and the like. In the 5G system, a basic unit of time for performing scheduling is referred to as a slot.

Figure 2:
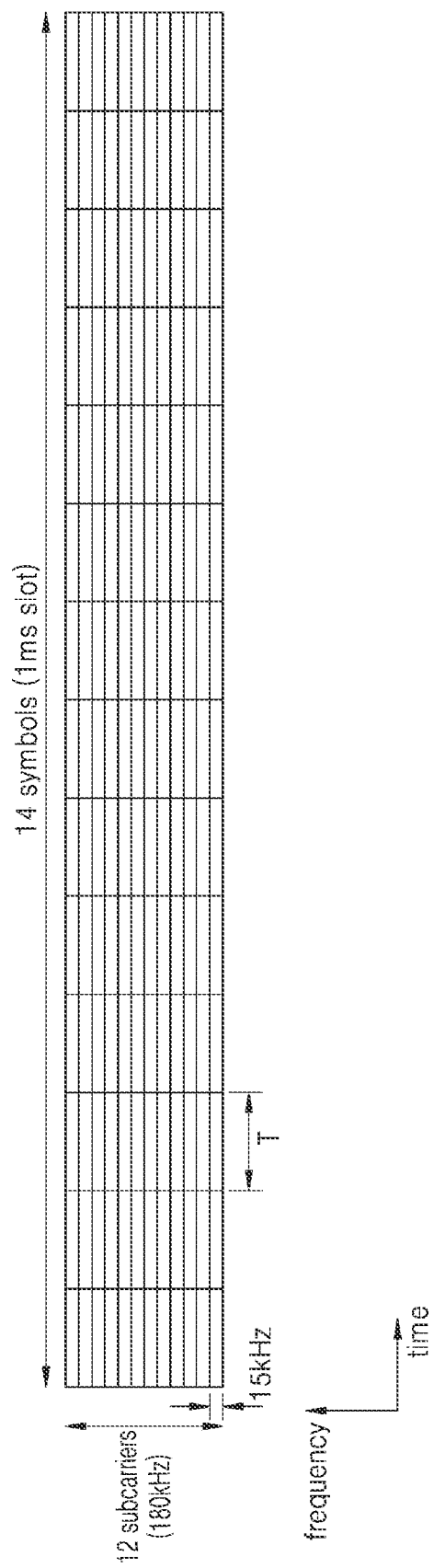
FIG. 2 is a diagram illustrating an example of an expanded frame structure of a 5G system according to some embodiments of the disclosure.

At an early stage when the 5G system will be introduced in the future, at least coexistence with the existing LTE/LTE-A system or dual mode operation is expected. Therefore, the existing LTE/LTE-A may provide stable system operation, and the 5G system may play a role of providing improved services. Therefore, the extended frame structure of the 5G system should include at least the frame structure of LTE/LTE-A or an essential parameter set. FIG. 2 illustrates a 5G frame structure such as the frame structure of LTE/LTE-A or an essential parameter set. Referring to FIG. 2, in a frame structure type A, a subcarrier spacing is 15 kHz, fourteen symbols constitute a 1 ms slot, and twelve subcarriers (=180 kHz=12×15 kHz) constitute a physical resource block (PRB).

Figure 3:
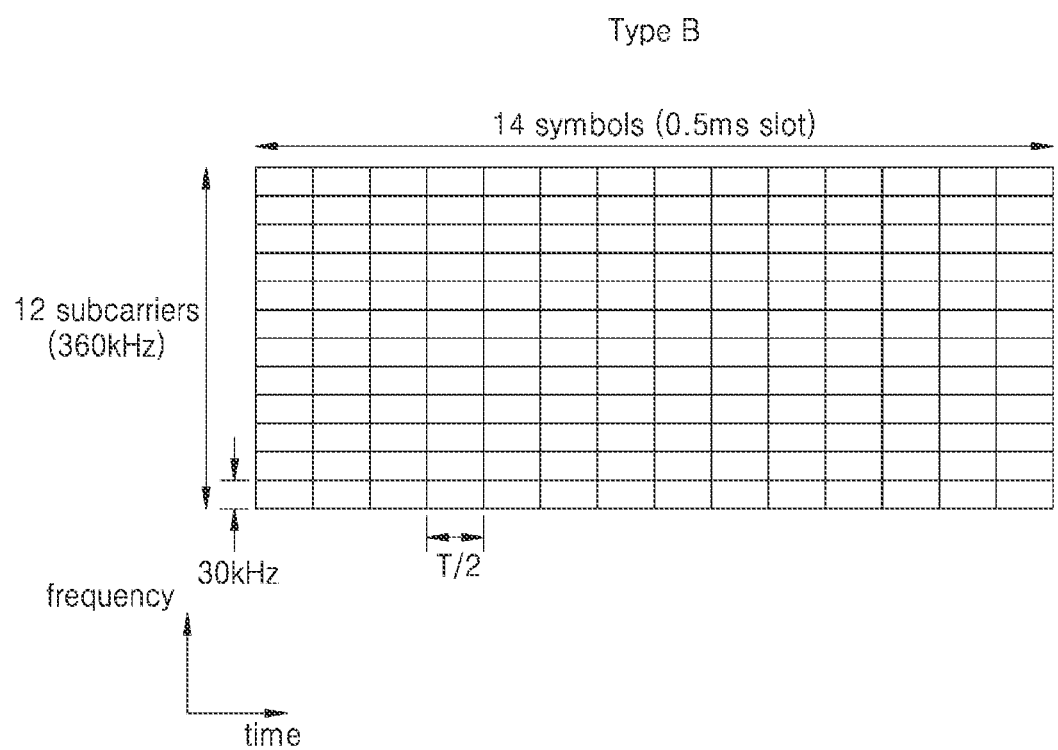
FIG. 3 is a diagram illustrating another example of an expanded frame structure of a 5G system according to some embodiments of the disclosure.

FIG. 3 illustrates a frame structure type B, in which a subcarrier spacing is 30 kHz, fourteen symbols constituting a 0.5 ms slot, and twelve subcarriers (=360 kHz=12×30 kHz) constitute a PRB. That is, compared to the frame structure type A, the subcarrier spacing and a PRB size are twice the size, and a slot length and a symbol length are half.

Figure 4:
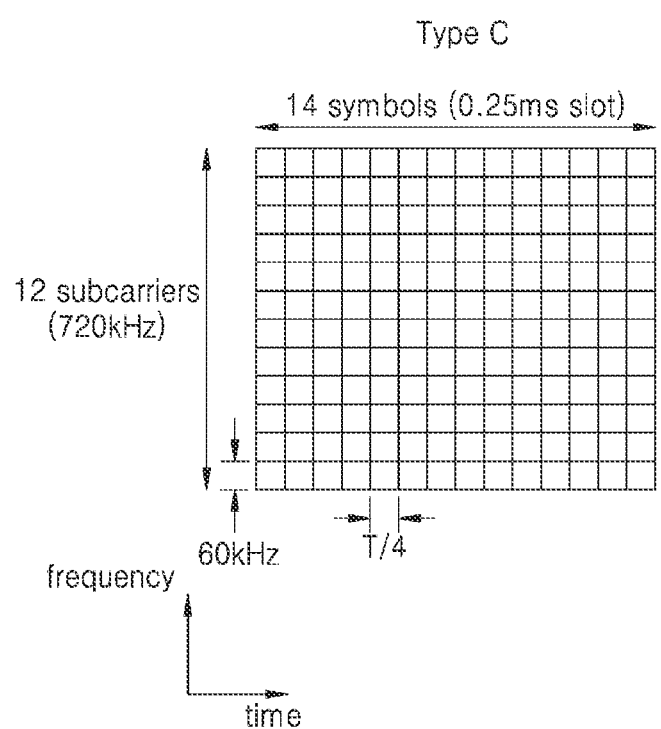
FIG. 4 is a diagram illustrating another example of an expanded frame structure of a 5G system according to some embodiments of the disclosure.

FIG. 4 illustrates a frame structure type C, in which a subcarrier spacing is 60 kHz, fourteen symbols constituting a 0.25 ms subframe, and twelve subcarriers (=720 kHz=12× 60 kHz) constitute a PRB. That is, the subcarrier spacing and the PRB size are four times greater than those of the frame structure type A, and a slot length and a symbol length are four times less than those of the frame structure type A.

Figure 5:
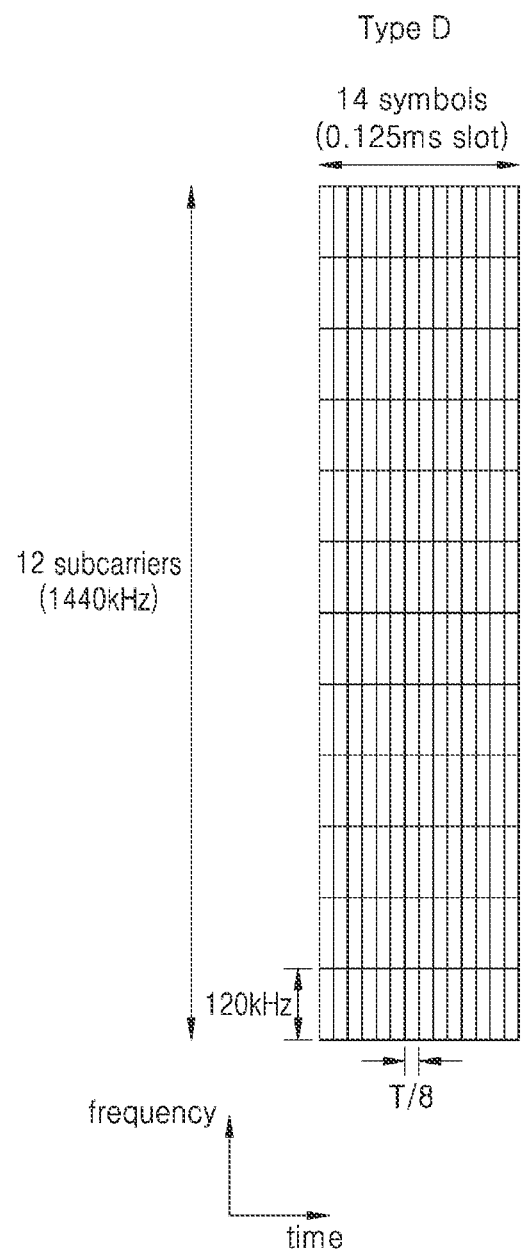
FIG. 5 is a diagram illustrating another example of an expanded frame structure of a 5G system according to some embodiments of the disclosure.

FIG. 5 illustrates a frame structure type D, in which a subcarrier spacing is 120 kHz, fourteen symbols constituting a 0.125 ms subframe, and twelve subcarriers (=720 kHz=12×60 kHz) constitute a PRB. That is, the subcarrier spacing and the PRB size are eight times greater than and a slot length and a symbol length are eight times less than those of the frame structure type A.

Figure 6:
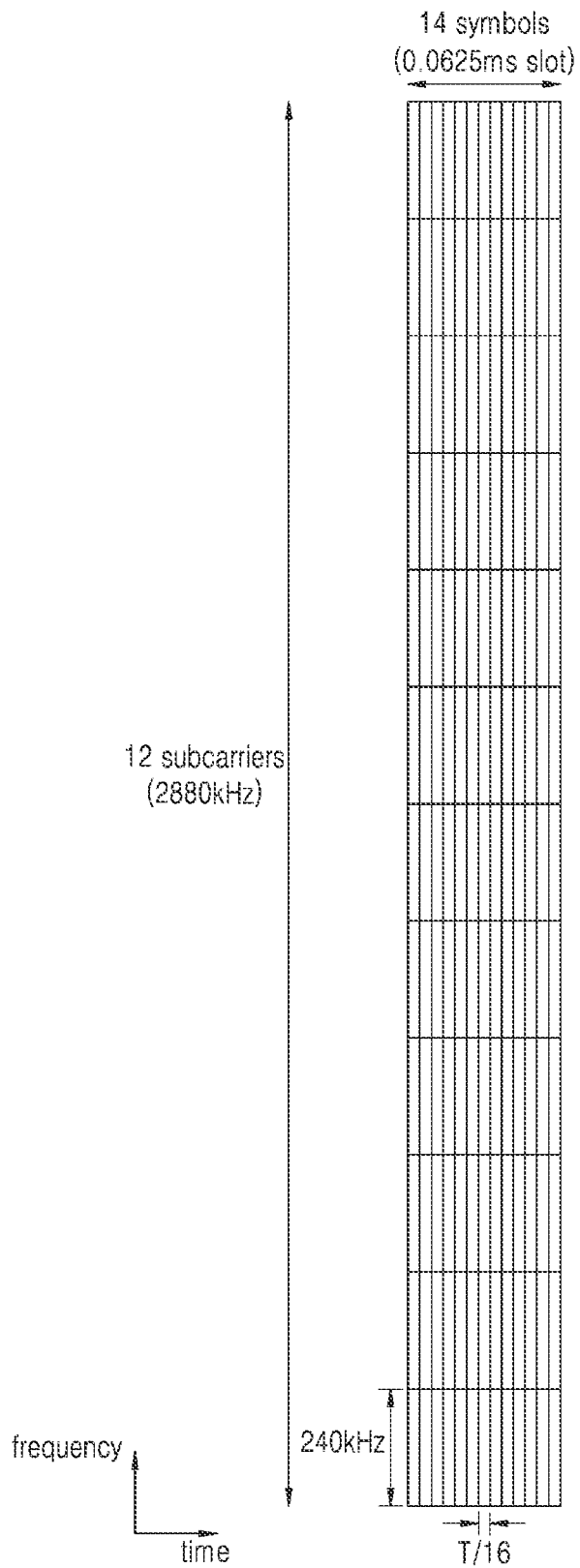
FIG. 6 is a diagram illustrating another example of an expanded frame structure of a 5G system according to some embodiments of the disclosure.

FIG. 6 illustrates a frame structure type E, in which a subcarrier spacing is 240 kHz, fourteen symbols constituting a 0.0625 ms subframe, and twelve subcarriers (=2880 kHz=12×240 kHz) constitute a PRB. That is, the subcarrier spacing and the PRB size are sixteen times greater than and a slot length and a symbol length are sixteen times less than those of the frame structure type A.

That is, when a frame structure type is generalized, high scalability may be provided by making a subcarrier spacing, a CP length, a slot length, and the like, which are included in an essential parameter set, have an integer multiple relationship to each other according to each frame structure type. In addition, a subframe having a fixed length of 1 ms is defined to indicate a reference time unit irrelevant to a frame structure type. Therefore, one subframe consists of one slot in the frame structure type A, one subframe consists of two slots in the frame structure type B, one subframe consists of four slots in the frame structure type C, one subframe consists of eight slots in the frame structure type D, and one subframe consists of sixteen slots in the frame structure type E. However, a frame structure type is not limited to the frame structure types A to E.

The above-described frame structure types are applicable to various scenarios. In terms of cell size, as the length of a CP increases, larger cells are supportable, and thus, the frame structure type A may support relatively larger cells than the frame structure types B, C, D, and E. In terms of an operating frequency band, the greater a subcarrier spacing is, the more advantageous phase noise recovery in a high-frequency band is, and thus, the frame structure types D and E may support relatively higher operating frequencies than the frame structure types A, B, and C. In terms of services, because the shorter a slot length, which is a basic time unit of scheduling, is, the more advantageous ultra-low-latency services, such as URLLC, may be supported, the frame structure types D and E are more suitable for URLLC services than the frame structure types A, B, and C.

In a 5G wireless communication system, a synchronization signal block may be transmitted for initial access, and the synchronization signal block may include a Primary Synchronization Signal (PSS), a Secondary Synchronization Signal (SSS), and a Physical Broadcast Channel (PBCH). At an initial access stage when a terminal first accesses the system, first, the terminal may synchronize a downlink time and a frequency domain with each other, based on a synchronization signal through cell search and obtain cell identification (ID). The synchronization signal may include a PSS and an SSS. In addition, the terminal may receive a Physical Broadcast Channel (PBCH) from a base station to obtain system information related to transmission and reception, such as a system bandwidth or related control information, and basic parameters. The synchronization signal is a reference signal for cell search, and a subcarrier spacing suitable for a channel environment such as phase noise is applied for each frequency band. A 5G base station may transmit a plurality of synchronization signal blocks according to the number of analog beams to be operated. The PSS and the SSS may be mapped and transmitted over twelve RBs, and the PBCH may be mapped and transmitted over twenty-four RBs. A structure in which a synchronization signal and a PBCH are transmitted in a 5G communication system will be described below.

Figure 7:
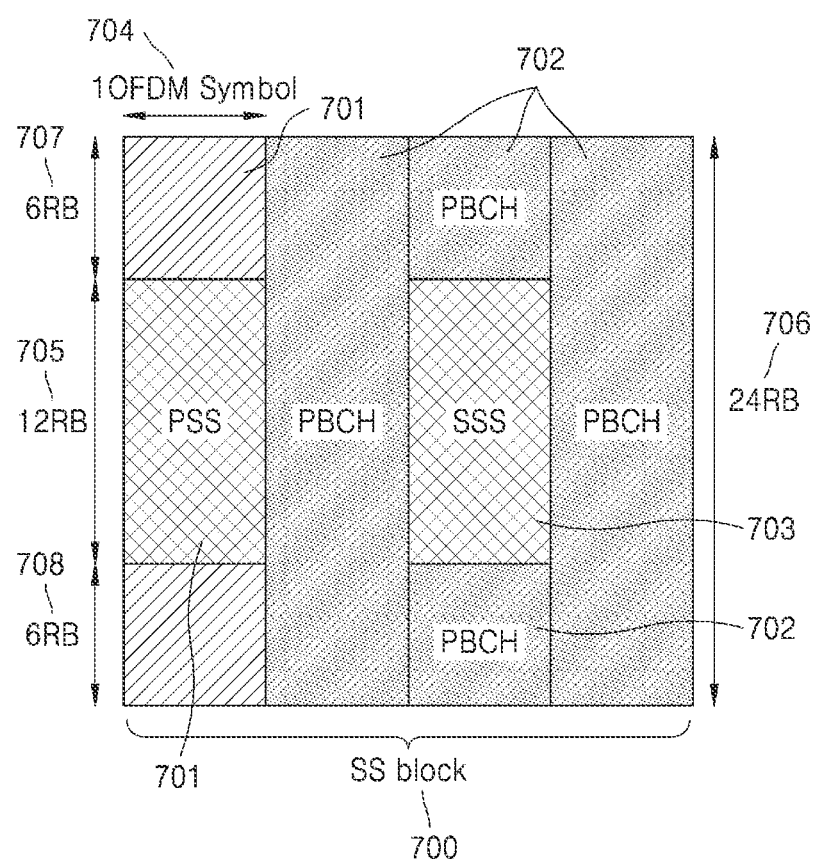
FIG. 7 is a diagram illustrating a synchronization signal block considered in a 5G communication system according to some embodiments of the disclosure.

FIG. 7 is a diagram illustrating a synchronization signal (SS) block 700 considered in a 5G communication system. The SS block 700 includes a PSS 701, an SSS 703, and a PBCH 702.

The PSS 701 and the SSS 703 may be transmitted using twelve RBs 705 on a frequency axis and using one OFDM symbol 704 on a time axis. In 5G, a total of 1008 different cell IDs may be defined, and the PSS 701 may have three different values and the SSS 703 may have 336 different values according to a physical layer ID of each cell. The terminal may identify one of 1008 cell IDs through the detection and combination of the PSS 701 and the SSS 703. This may be expressed by Equation 2 below.

$$N_{ID}^{cell}=3N_{ID}^{(1)}+N_{ID}^{(2)} \qquad \text{[Equation 2]}$$

$N^{(1)}_{ID}$ may be estimated from the SSS 703 and have a value between 0 and 335. $N^{(2)}_{ID}$ may be estimated from the PSS 701 and have a value between 0 and 2. $N^{cell}_{ID}$, which is a cell ID, may be estimated through a combination of $N^{(1)}_{ID}$ and $N^{(2)}_{ID}$.

The PBCH 702 may be transmitted using six RBs on both sides (RBs 707 and 708 in FIG. 3) excluding twelve RBs at the center, while twenty-four RBs 706 are transmitted on the frequency axis and two OFDM symbols 704 and the SSS 703 are transmitted on the time axis. Various system information called a Master Information Block (MIB) may be transmitted in the PBCH 702, and more specifically, the MIB includes the following information.

synchronization signal block information: indicates an offset of a frequency domain of a synchronization signal block through 4 bits in an MIB. An index of the synchronization signal block including a PBCH may be obtained indirectly through decoding of a PBCH demodulation reference signal (DMRS) and the PBCH. More specifically, in a frequency band of 6 GHz or less, 3 bits are used to indicate the synchronization signal block index through decoding of the PBCH DMRS. In a frequency band greater than 6 GHz, 3 bits are used to decode the PBCH DMRS, 3 bits are used to decode the PBCH, i.e., a total of 6 bits are used to indicate the synchronization signal block index including the PBCH.

physical Downlink Control Channel (PDCCH) information: indicates a subcarrier spacing of a common control channel through 1 bit in the MIB, and indicates time-frequency resource configuration information of a Common Resource Set (CORESET) through 8 bits.

System Frame Number (SFN): 6 bits in the MIB are used to indicate a part of the SFN. Least Significant Bits (LSBs), e.g., 4 bits, of the SFN may be obtained indirectly by decoding the PBCH.

Timing information in a radio frame: it is possible to indirectly obtain whether the synchronization signal block is transmitted in a first or second half frame of a radio frame through 1 bit by using the above-described synchronization signal block index and decoding the PBCH.

As described above, the synchronization signal block 700 includes the PSS 701, the SSS 703, and the PBCH 702, and is mapped to a total of four OFDM symbols on the time axis. Because a transmission bandwidth (the twelve RBs 705) of the PSS 701 and the SSS 703 and a transmission bandwidth (the twenty-four RBs 706) of the PBCH 702 are different from each other, in an OFDM symbol in which a PSS 701 is transmitted in a transmission band (the twenty-four RBs 706) of the PBCH 702, there are six RBs (corresponding to the RBs 707 of FIG. 3) on both sides excluding twelve RBs in which the PSS 701 is transmitted, and the region 707 may be used to transmit another signal or be empty.

All of synchronization signal blocks may be transmitted using the same analog beam. That is, the PSS 701, the SSS 703, and the PBCH 702 may all be transmitted with the same beam. An analog beam cannot be applied as a frequency axis and thus the same analog beam may be applied to all RBs on the frequency axis within a certain OFDM symbol to which a certain analog beam is applied. That is, all four OFDM symbols in which the PSS 701, the SSS 703, and the PBCH 702 are transmitted may be transmitted using the same analog beam.

Figure 8:
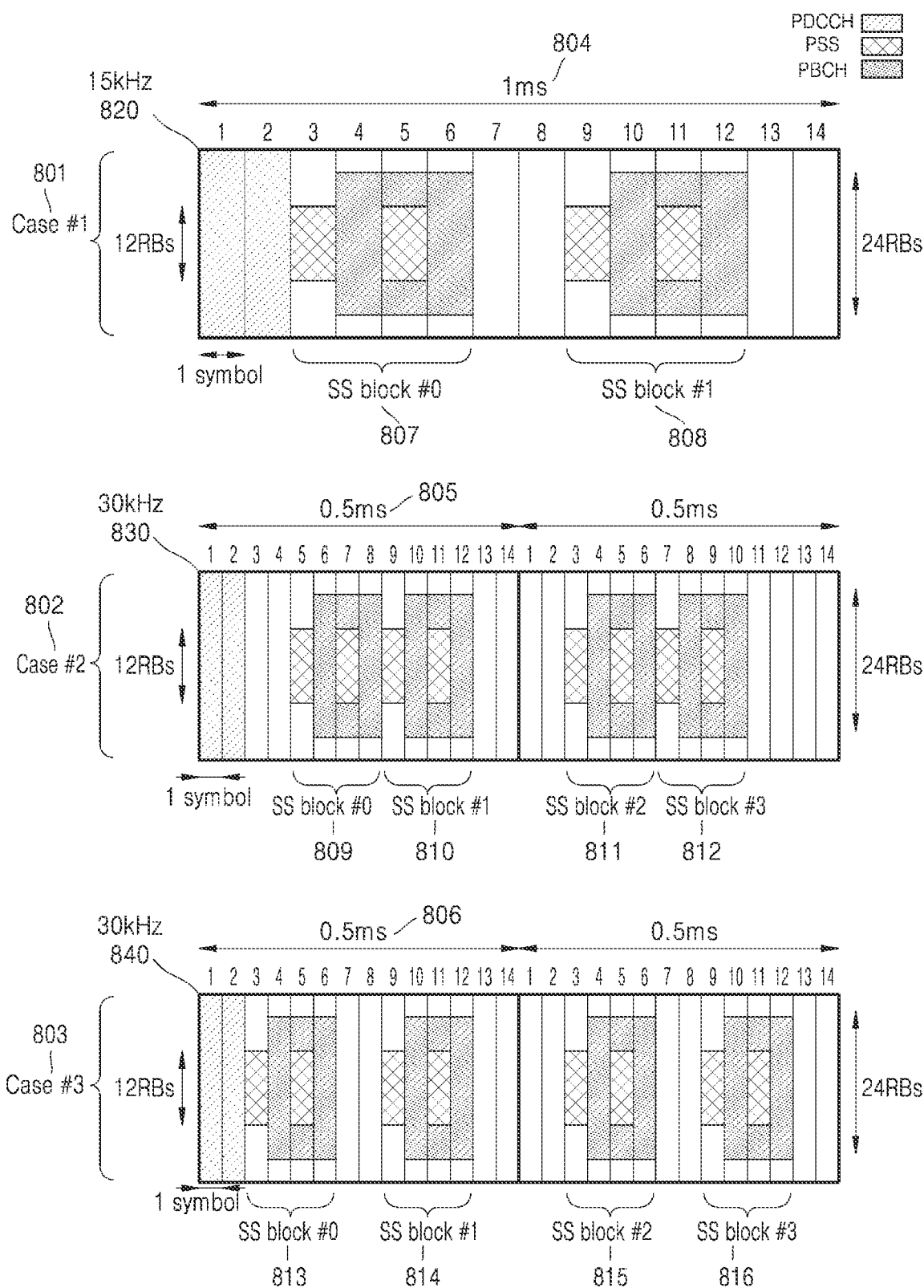
FIG. 8 is a diagram illustrating a transmission pattern of a synchronization signal block in a frequency band of 6 GHz or less, which is considered in a 5G communication system, according to some embodiments of the disclosure.

FIG. 8 is a diagram showing cases of transmission of a synchronization signal block in a frequency band of 6 GHz or less considered in a 5G communication system. In a 5G communication system, a subcarrier spacing 820 of 15 kHz and subcarrier spacings 830 an 840 of 30 kHz may be used to transmit a synchronization signal block in a frequency band of 6 GHz or less. There is one synchronization signal block transmission case (case #1 801 of FIG. 8) at the subcarrier spacing of 15 kHz, and there are two synchronization signal block transmission cases (case #2 802 and case #3 803) at the subcarrier spacing of 30 kHz.

In the synchronization signal block case #1 801 at the subcarrier spacing 820 of 15 kHz, two synchronization signal blocks or less may be transmitted within a time 804 of 1 ms (corresponding to the length of one slot when one slot consists of fourteen OFDM symbols). In the example of FIG. 8, a synchronization signal block #0 807 and a synchronization signal block #1 808 are illustrated. In this case, the synchronization signal block #0 807 may be mapped to four consecutive symbols in a third OFDM symbol, and the synchronization signal block #1 808 may be mapped to four consecutive symbols in a ninth OFDM symbol. Different analog beams may be applied to the synchronization signal block #0 807 and the synchronization signal block #1 808. Therefore, the same beam may be applied to all a third OFDM symbol to a sixth OFDM symbol to which the synchronization signal block #0 807 is mapped, and the same beam may be applied to all a ninth OFDM symbol a twelfth OFDM symbol to which the synchronization signal block #1 808 is mapped. A beam to be applied to seventh, eighth, thirteenth, and fourteenth OFDM symbols to which no synchronization signal block is mapped may be freely determined by a base station.

In the synchronization signal block case #2 802 at the subcarrier spacing 830 of 30 kHz, two synchronization signal blocks or less may be transmitted within a time 805 of 0.5 ms (corresponding to the length of one slot when one slot consists of fourteen OFDM symbols), and thus, four or less synchronization signal blocks may be transmitted within a time of 1 ms (corresponding to the length of two slots when one slot consists of fourteen OFDM symbols). It is illustrated in the example of FIG. 8 that the synchronization signal block #0 809, the synchronization signal block #1 810, the synchronization signal block #2 811, and the synchronization signal block #3 812 are transmitted within 1 ms (two slots). In this case, the synchronization signal block #0 809 and the synchronization signal block #1 810 may be mapped to a fifth OFDM symbol and a ninth OFDM symbol of a first slot, respectively, and the synchronization signal block #2 811 and the synchronization signal block #3 812 may be mapped to a third OFDM symbol and a seventh OFDM symbol of a second slot, respectively. Different analog beams may be applied to the synchronization signal block #0 809, the synchronization signal block #1 810, the synchronization signal block #2 811, and the synchronization signal block #3 812. Therefore, the same analog beam may be applied to fifth to eighth OFDM symbols of a first slot in which the synchronization signal block #0 809 is transmitted, the same analog beam may be applied to ninth to twelfth OFDM symbols of the first slot in which the synchronization signal block #1 810 is transmitted, the same analog beam may be applied to third to sixth symbols of a second slot in which the synchronization signal block #2 811 is transmitted, and the same analog beam may be applied to seventh to tenth symbols of the second slot in which the synchronization signal block #3 812 is transmitted. A beam to be applied to OFDM symbols to which no synchronization signal block is mapped may be freely determined according to a decision of the base station.

In the synchronization signal block case #3 803 at the subcarrier spacing 840 of 30 kHz, two synchronization signal blocks or less may be transmitted within a time 806 of 0.5 ms (corresponding to the length of one slot when one slot consists of fourteen OFDM symbols), and thus, four or less synchronization signal blocks may be transmitted within a time of 1 ms (corresponding to the length of two slots when one slot consists of fourteen OFDM symbols). It is illustrated in the example of FIG. 8 that a synchronization signal block #0 813, a synchronization signal block #1 814, a synchronization signal block #2 815, and a synchronization signal block #3 816 are transmitted within 1 ms (two slots). In this case, the synchronization signal block #0 813 and the synchronization signal block #1 814 may be mapped to a third OFDM symbol and a ninth OFDM symbol of a first slot, respectively, and the synchronization signal block #2 815 and the synchronization signal block #3 816 may be mapped to a third OFDM symbol and a ninth OFDM symbol of a second slot, respectively. Different analog beams may be used for the synchronization signal block #0 813, the synchronization signal block #1 814, the synchronization signal block #2 815, and the synchronization signal block #3 816. As described above, the same analog beam may be used for all four OFDM symbols in which synchronization signal blocks are transmitted, and a beam to be used for OFDM symbols to which no synchronization signal block is mapped may be freely determined by a base station.

Figure 9:
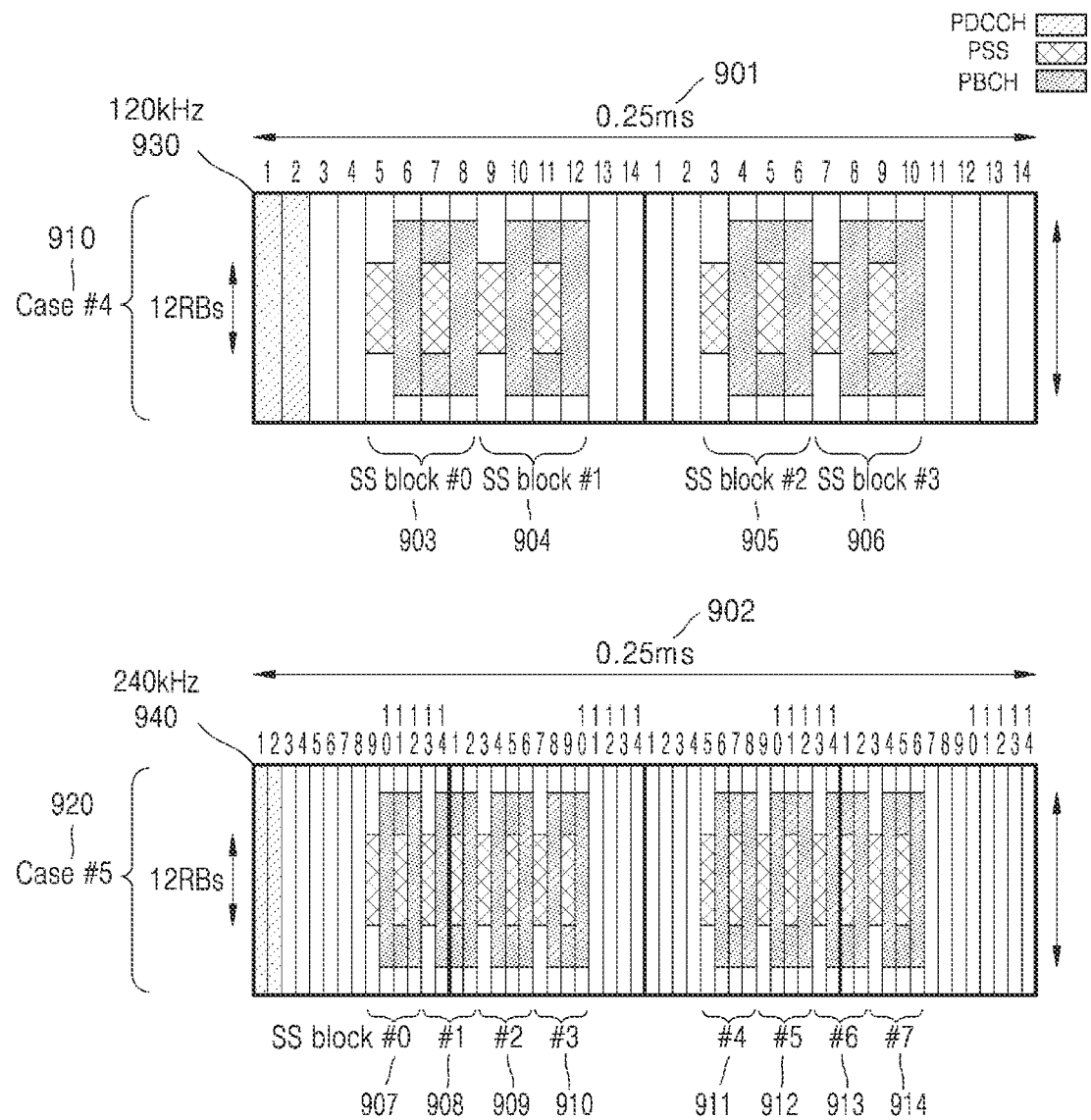
FIG. 9 is a diagram illustrating a transmission pattern of a synchronization signal block in a frequency band greater than 6 GHz, which is considered in a 5G communication system, according to some embodiments of the disclosure.

FIG. 9 is a diagram illustrating cases of transmission of a synchronization signal block in a frequency band greater than 6 GHz, which is considered in a 5G communication system, according to some embodiments of the disclosure. In a 5G communication system, in a frequency band of 6 GHz or more, a subcarrier spacing 930 of 120 kHz and a subcarrier spacing 940 of 240 kHz may be used to transmit synchronization signal blocks.

In a synchronization signal block case #4 910 at a subcarrier spacing 930 of 120 kHz, four or less synchronization signal blocks may be transmitted within a time 901 of 0.25 ms (corresponding to the length of two slots when one slot consists of fourteen OFDM symbols). It is illustrated in an example of FIG. 9 that a synchronization signal block #0 903, a synchronization signal block #1 904, a synchronization signal block #2 905, and a synchronization signal block #3 906 are transmitted within 0.25 ms (two slots). In this case, the synchronization signal block #0 903 and the synchronization signal block #1 904 may be mapped to a fifth OFDM symbol and a ninth OFDM symbol of a first slot, respectively, and the synchronization signal block #2 905 and the synchronization signal block #3 906 may be mapped to a third OFDM symbol and a seventh OFDM symbol of a second slot, respectively. As described above, different analog beams may be used for the synchronization signal block #0 903, the synchronization signal block #1 904, the synchronization signal block #2 905, and the synchronization signal block #3 906. The same analog beam may be used for all four OFDM symbols in which synchronization signal blocks are transmitted, and a beam to be used for OFDM symbols to which no synchronization signal block is mapped may be freely determined by a base station.

In a synchronization signal block case #5 920 at a subcarrier spacing 940 of 240 kHz, eight or less synchronization signal blocks may be transmitted within a time 902 of 0.25 ms (corresponding to the length of four slots when one slot consists of fourteen OFDM symbols). It is illustrated in the example of FIG. 9 that a synchronization signal block #0 907, a synchronization signal block #1 908, a synchronization signal block #2 909, a synchronization signal block #3 910, a synchronization signal block #4 911, a synchronization signal block #5 912, synchronization signal block #6 913, and a synchronization signal block #7 914 are transmitted within 0.25 ms (four slots). In this case, the synchronization signal block #0 907 and the synchronization signal block #1 908 may be mapped to the ninth OFDM symbol and a thirteenth OFDM symbol of the first slot, respectively, the synchronization signal block #2 909 and the synchronization signal block #3 910 may be mapped to a third OFDM symbol and a seventh OFDM symbol of the second slot, respectively, the synchronization signal block #4 911, the synchronization signal block #5 912, and the synchronization signal block #6 913 may be mapped to a fifth OFDM symbol, a ninth OFDM symbol, and a thirteenth OFDM symbol of a third slot, respectively, and the synchronization signal block #7 914 may be mapped to a third OFDM symbol of a fourth slot. As described above, different analog beams may be used for the synchronization signal block #0 907, the synchronization signal block #1 908, the synchronization signal block #2 909, the synchronization signal block #3 910, the synchronization signal block #4 911, the synchronization signal block #5 912, the synchronization signal block #6 913, and the synchronization signal block #7 914. The same analog beam may be used for all four OFDM symbols in which synchronization signal blocks are transmitted, and a beam to be used for OFDM symbols to which no synchronization signal block is mapped may be freely determined by a base station.

Figure 10:
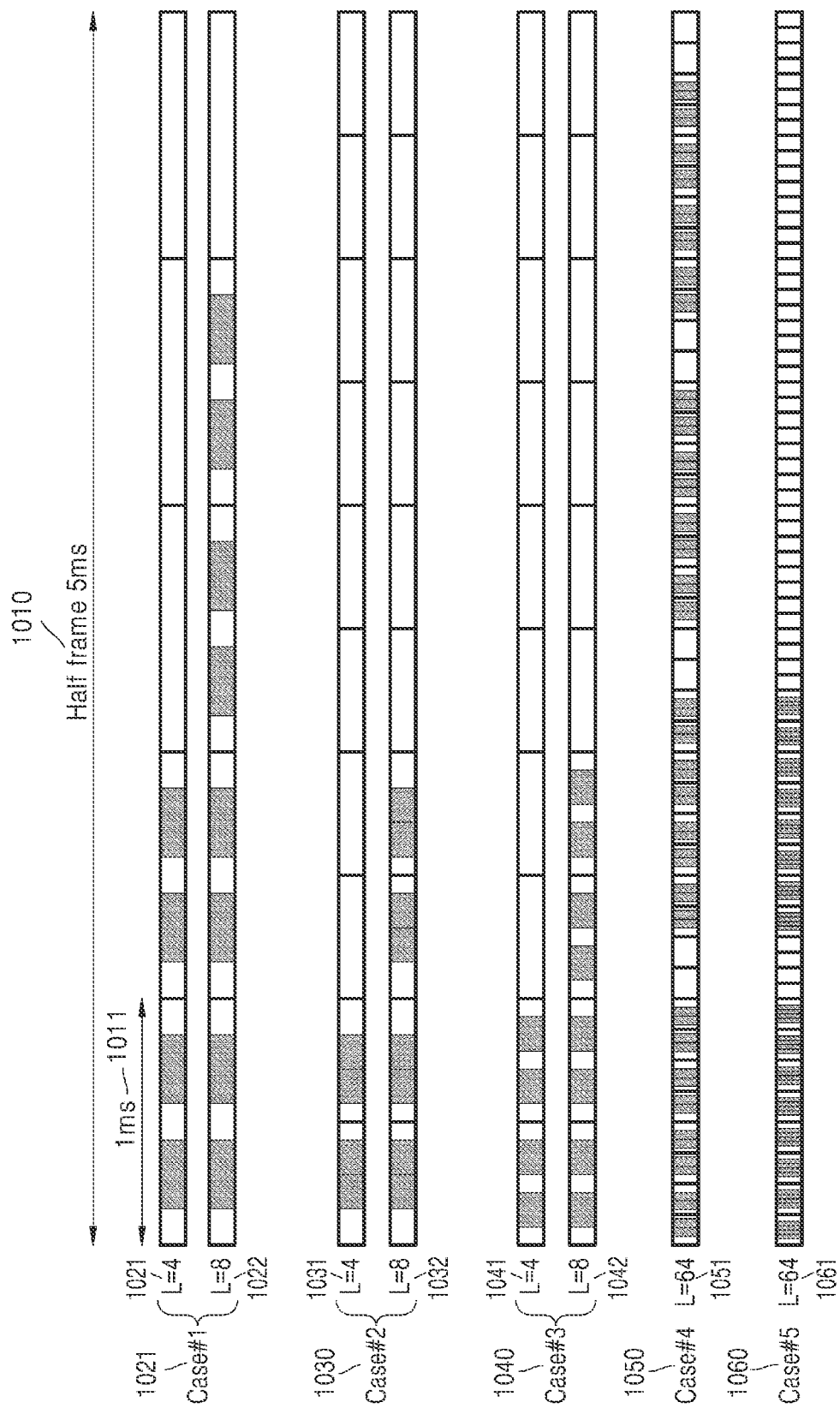
FIG. 10 is a diagram illustrating a transmission pattern of a synchronization signal block in a 5G communication system according to some embodiments of the disclosure.

FIG. 10 is a diagram illustrating synchronization signal block transmission cases according to a subcarrier spacing within a time 1010 of 5 ms according to some embodiments of the disclosure. In a 5G communication system, synchronization signal blocks are periodically transmitted in units of 5 ms (corresponding to five subframes or half frames). In a frequency band of 3 GHz or less, up to four synchronization signal blocks may be transmitted within a time 1010 of 5 ms. Up to eight synchronization signal blocks may be transmitted in a frequency band of 3 GHz or more and 6 GHz or less. Up to sixty-four synchronization signal blocks may be transmitted in a frequency band greater than 6 GHz. As described above, the subcarrier spacings of 15 kHz and 30 kHz may be used at frequencies of 6 GHz or less. Referring to FIG. 10, a synchronization signal block case #1 1020 at a subcarrier spacing of 15 kHz consisting of one slot may be mapped to a first slot and a second slot in a frequency band of 3 GHz or less and thus up to four synchronization signal blocks 1021 may be transmitted, and may be mapped to the first, second, third, and fourth slots in a frequency band of 3 GHz or more and 6 GHz or less and thus up to eight synchronization signal blocks 1022 may be transmitted. A synchronization signal block case #2 1030/synchronization signal block case #3 1040 at a subcarrier spacing of 30 kHz consisting of two slots may be mapped starting from a first slot in a frequency band of 3 GHz or less and thus up to four synchronization signal blocks 1031 may be transmitted, and may be mapped starting from first and third slots in a frequency band of 3 GHz or more and 6 GHz or less and thus up to eight synchronization signal blocks 1032 may be transmitted.

Subcarrier spacings 120 kHz and 240 kHz may be used at frequencies above 6 GHz. In the example of FIG. 10, a synchronization signal block case #4 1050 at a subcarrier spacing of 120 kHz consisting of two slots may be mapped in a frequency band of 6 GHz or more starting from 1st, 3rd, 5th, 7th, 11th, 13th, 15th, 17th, 21th, 23th, 25th, 27th, 31st, 33rd, 35th, and 37th slots, and thus, up to sixty-four synchronization signal blocks 1051 may be transmitted. In the example of FIG. 10, a synchronization signal block case #5 1060 at a subcarrier spacing of 240 kHz consisting of four slots may be mapped in a frequency band of 6 GHz or more starting from 1st, 5th, 9th, 13th, 21st, 25th, 29th, and 33rd slots and thus up to sixty-four synchronization signal blocks 1061 may be transmitted.

Figure 11:
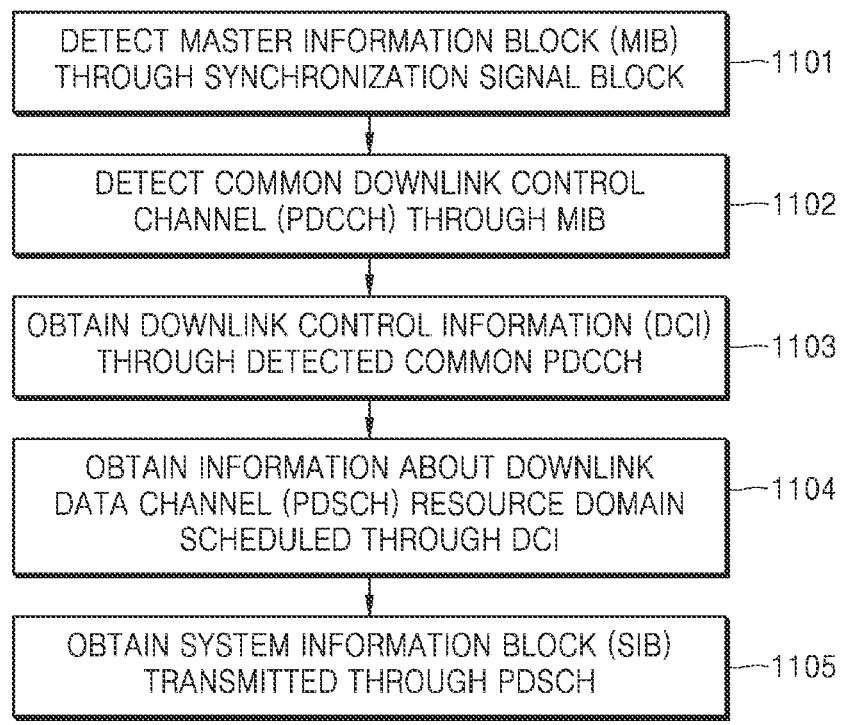
FIG. 11 is a flowchart of a process of transmitting system information from a 5G communication system according to some embodiments of the disclosure.

A process of transmitting system information will be described in detail with reference to FIG. 11 below. Referring to FIG. 11, in first operation 1101, a base station periodically transmits a synchronization signal block (SSB), including a synchronization signal and a physical broadcast channel (PBCH), to a plurality of terminals in the system, and a terminal performs time/frequency synchronization through the synchronization signal and receives an MIB, which is essential system information, through the PBCH. In second operation 1102, the terminal monitors or searches for a common downlink control channel (hereinafter referred to as "PDCCH") in a common downlink control channel region (hereinafter referred to as a "control resource set (CORE-SET)" or "a search space (SS)"), based on information about a time domain and a frequency domain, which are configured through the MIB. In third operation 1103, when the terminal searches for the common PDCCH, the terminal obtains downlink control information (DCI) transmitted through the searched-for common PDCCH. In fourth operation 1104, the terminal may obtain scheduling information for a downlink data channel or an uplink data channel through the DCI. In other words, the DCI may include at least one of information about a resource region (or a downlink data channel (PDSCH) transmission region) for receiving a PDSCH transmitted from the base station or information about a resource region allocated from the base station to transmit an uplink data channel (PUSCH). In fifth operation 1105, various types of system information called system information block (SIB) may be transmitted in the scheduled downlink data channel. The SIB may include actually transmitted synchronization signal block indication information, and uplink-downlink configuration information in a TDD system.

Figure 12:
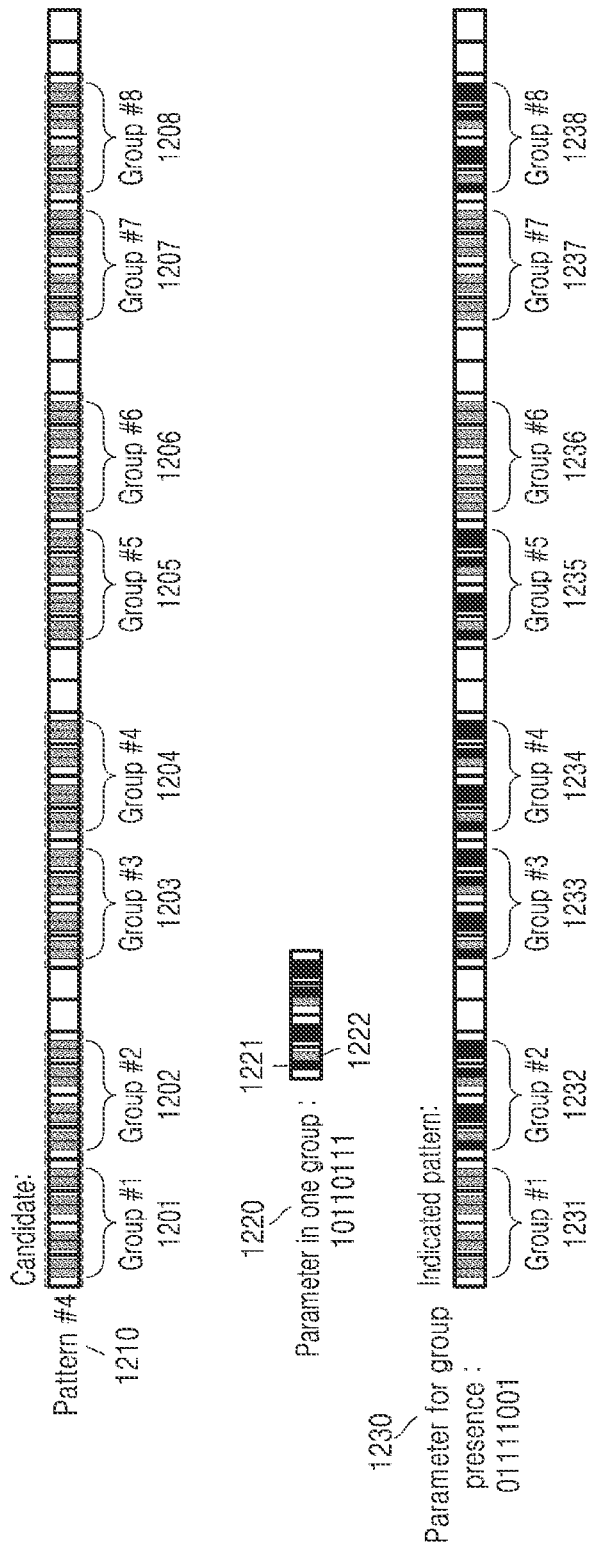
FIG. 12 is a diagram illustrating synchronization signal block information actually transmitted in system information from a 5G communication system according to some embodiments of the disclosure.

Actually transmitted synchronization signal block indication information included in a system will be described in detail with reference to FIG. 12 below. As described above, the actually transmitted synchronization signal block indication information may be obtained from system information called SIB or obtained through higher-layer signaling. The actually transmitted synchronization signal block indication information included in the system information can be indicated in 8 bits to express the transmission of up to 8 synchronization signal blocks in a frequency band below 6 GHz and a maximum of 64 synchronization signal blocks in a frequency band above 6 GHz. In order to express the transmission of (1210), a total of 16 bits can be indicated. More specifically, in a frequency band of 6 GHz or less, 1 bit indicates whether or not one synchronization signal block is transmitted. When a first MSB is 1, 1 indicates that a first synchronization signal block is actually transmitted from a base station, and when the first MSB is 0, 0 indicates that the first synchronization signal block is not transmitted from the base station. FIG. 12 is a diagram illustrating a concrete example of a case in which a synchronization transmission block is transmitted at a subcarrier of 120 kHz in a frequency band of 6 GHz or more. In order to represent whether up to 64 synchronization signal blocks are transmitted in a frequency band of 6 GHz or more, the 64 synchronization signal blocks are grouped into eight groups 1201, 1202, 1203, 1204, 1205, 1206, 1207, and 1208 each including eight synchronization signal blocks. Accordingly, a total of 16 bits, e.g., 8 bits 1220 indicating whether eight synchronization signal blocks of one group are transmitted and 8 bits 1230 indicating the presence or absence of eight groups, may be represented. 8 bits indicating whether synchronization signal blocks of one group are transmitted represent one pattern 1220, similar to that at the above-described frequency band of 6 GHz or less. Specifically, when a first MSB is 1, 1 indicates that a first synchronization signal block is transmitted from a base station (1221), and when a second MSB is 0, 0 indicates that a second synchronization signal block is not actually transmitted from the base station (1222). Among 8 bits 1230 indicating the presence or absence of eight groups, when a first MSB 1231 is 0, it indicates that all eight synchronization signal blocks of a first group Group #1 1231 are not transmitted. When a second MSB is 1, it indicates that eight synchronization signal blocks of a second group Group #2 1232 are transmitted according to the transmission pattern 1220 of eight consecutive synchronization signal blocks of one group. Synchronization signal block indication information actually transmitted through higher-layer signaling rather than system information may be indicated with a total of 64 bits, because 1 bit represents whether one synchronization signal block is transmitted to represent whether up to 64 synchronization signal blocks are transmitted regardless of a frequency band.

UL-DL configuration information may be semi-permanently indicated in units of slots through cell-specific configuration information through system information and user-specific configuration information through dedicated higher-layer signaling. Here, whether each of the slots is a downlink slot, an uplink slot, or a flexible slot may be indicated through the UL-DL configuration information. In this case, the UL-DL configuration information may include information regarding a period of the indicated slots and subcarrier information that is a criterion for the period of the slots. The UL-DL configuration information among a set of pre-defined available period values may be configured by the base station through a higher layer signal. In order to dynamically change a downlink signal transmission section and an uplink signal transmission duration (resources), a slot format indicator (SFI) may be used to indicate whether each of OFDM symbols of one slot is a downlink symbol, an uplink symbol, or a flexible symbol.

As described above, in actually transmitted entire synchronization signal block indication information included in system information, a total of sixty-four synchronization signal blocks are represented in a limited manner by expressing eight groups according to a pattern representing eight synchronization signal blocks. Thus, the base station may transmit a synchronization signal block in a very limited manner or differently from synchronization signal block indication information specified in the system information. When there is a discrepancy between a displayed pattern of the system information and an actually transmitted pattern due to the limitation of the synchronization signal block indication information specified in the system information, the following problem may occur. When a transmitted synchronization signal block configured in an initial access terminal and a transmitted synchronization signal block configured in a connected terminal are different due to a discrepancy between the system information and higher-layer signaling, the initial access terminal and the connected terminal may have a different correlation between a synchronization signal block and a Random Access Channel (RACH). This is because the correlation between the synchronization signal block and the RACH is defined according to the number and order of actually transmitted synchronization signal blocks. When the transmitted synchronization signal block configured in the initial access terminal and the transmitted synchronization signal block configured in the connected terminal are different from each other, terminals detecting different synchronization signal blocks may transmit a PRACH to the same location and thus such a problem should be avoided.

In addition, when only synchronization signal block indication information of the system information, which may be represented with 16 bits, is allowed for actual transmission, the number/pattern of synchronization signal blocks for actual transmission and UL-DL configuration in an available TDD system (especially, uplink slot timing and periodicity) are significantly limited.

Figure 13:
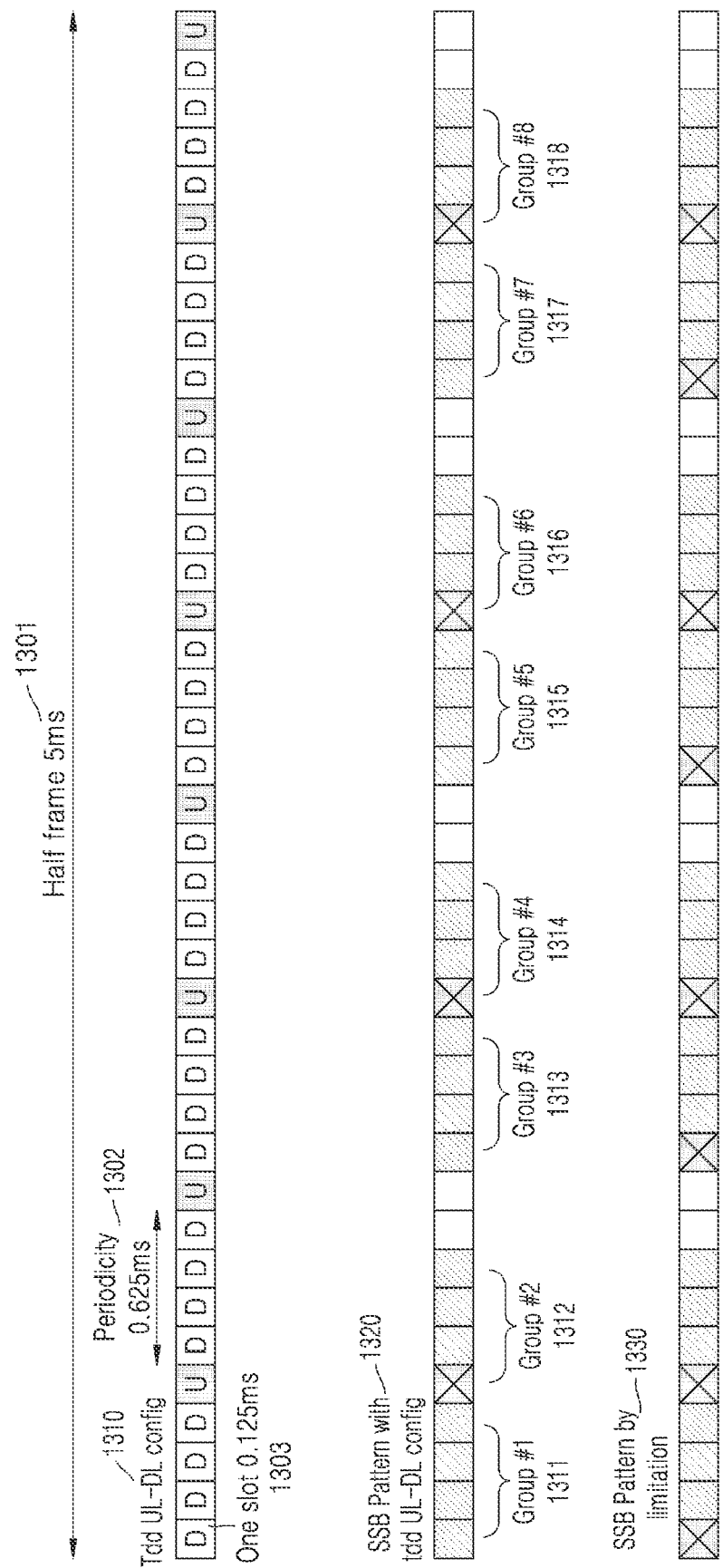
FIG. 13 is a diagram illustrating a concrete example of a synchronization signal block pattern and an uplink-downlink configuration constraint in a 5G communication system according to some embodiments of the disclosure.

FIG. 13 is a diagram illustrating concrete examples of synchronization signal block indication information for actual transmission and uplink-downlink configuration constraints in a TDD system. In a TDD system with a subcarrier spacing of 120 kHz, in order to set a pattern for periodically and consecutively transmitting a downlink in four slots and transmitting an uplink in one slot, a synchronization signal block period 1301 of 5 ms has a structure 1310 in which the pattern is repeated in units of five slots 1302 a total of eight times. At a subcarrier spacing of 120 kHz, two synchronization signal blocks are included in one slot (910), and slots in which synchronization signal blocks may be transmitted and the above-described eight groups 1320 (in the system information, eight groups for representation of actually transmitted synchronization signal blocks) include four consecutive slots, starting from a 1st slot 1311, a 5th slot 1312, an 11th slot 1313, a 15th slot 1314, a 21st slot 315, a 25th slot 1316, a 31st slot 1317, and a 35th slot 318. However, slots allocated to the uplink and the slots in which the synchronization signal blocks may be transmitted overlap the 5th, 15th, 25th, and 35th slots 1320. A synchronization signal block transmitted via the downlink and a slot allocated to the uplink cannot collide with each other and thus the synchronization signal block cannot be transmitted (1320). In this case, when actually transmitted synchronization signal block indication information is notified through the system information, eight groups should be expressed in one pattern, and thus, synchronization signal blocks may not be capable of being transmitted in all groups including overlapping slots or first slots in all groups (overlapping 5th, 15th, 25th, and 35th slots are the first slot in each of the eight groups and correspond to the first and second synchronization signal blocks) cannot be transmitted (1330).

Accordingly, the disclosure provides a method of representing synchronization signal block transmission indication information by a base station, and a method of identifying synchronization signal block indication information by a terminal for which a structure of slots are periodically configured through an uplink-downlink configuration by higher layer signaling.

Methods and devices suggested in embodiments of the disclosure herein are limited thereto and are applicable to a method and device for identifying slot format indicator information through a combination of all or part of one or more embodiments set forth herein. Although a case in which UL-DL configuration information is semi-persistently indicated in units of slots by common higher layer signaling will be described as an example in an embodiment of the disclosure, embodiments of the disclosure are applicable even when UL-DL configuration information is indicated through a slot format indicator (SFI) transmitted to a certain terminal or a terminal of a certain group through a PDCCH so as to dynamically change a downlink signal transmission section and an uplink signal transmission section.

Well-known functions or constructions related to explaining the disclosure are not described in detail when it is determined that they would obscure the subject matter of the disclosure due to unnecessary detail. Terms to be described below should be defined in consideration of functions of the disclosure but may be variable depending on the intention of users or operators, practices, or the like. Therefore, the terms should be defined based on the whole context of the disclosure.

First Embodiment

A first embodiment of the disclosure provides a method of identifying synchronization signal block indication information by a terminal, based on a period of an uplink-downlink configuration and a period of a synchronization signal block pattern in an UL-DL configuration received from a base station through system information. Considerable restrictions on the number/pattern of synchronization signal blocks for actual transmission and an UL-DL configuration (especially, uplink slot timing and periodicity) in a TDD system as described above may occur due to a discrepancy between a period of the UL-DL configuration and a period of synchronization signal block pattern. Sixty-four synchronization signal blocks may be transmitted in a frequency band of 6 GHz or more. In this case, it can be seen that a slot in which a synchronization signal block may be transmitted is repeated in a period of ten slots at a subcarrier spacing 1051 of 120 kHz and is repeated in a period of twenty slots at a subcarrier spacing 1061 of 240 kHz. Because the terminal is capable of identifying the period of the UL-DL configuration through higher-layer signaling, a method of determining synchronization signal block indication information may be defined as follows. In consideration of the period of the UL-DL configuration, sixty-four synchronization signal blocks may be divided into $N_g$ groups each including $N_{ssb}$ synchronization signal blocks. In this case, $N_{ssb}$ and $N_g$ are integers or natural numbers greater than 0, a product of $N_{ssb}$ and $N_g$ should be equal to or greater than 64, and $N_{ssb}$ and $N_g$ may be determined from a set of available predefined values.

FIG. 14 illustrates an example of a method of determining the number $N_g$ of groups of synchronization signal blocks and the number $N_{ssb}$ of synchronization signal blocks included in one group according to the first embodiment of the disclosure. When a period of a UL-DL configuration at a subcarrier spacing of 120 kHz in a frequency band of 6 GHz or more is configured as a unit of five slots 1402, slots in which synchronization signal blocks may be transmitted are repeated in a period of ten slots 1403 and thus ten slots 1403 (10 is a least common multiple of 5 and 10) are considered as one group. In this case, there are eight slots 1411, 1412, 1413, and 1414 in which synchronization signal blocks may be transmitted among ten slots, and two synchronization signal blocks may be transmitted in one slot. Thus, a total of $N_{ssb}$=16 synchronization signal blocks may correspond to one group and be divided into $N_g$=4 groups.

After the number $N_{ssb}$ of synchronization signal blocks included in one group and $N_g$ groups are determined, based on the period of the UL-DL configuration and a period of a synchronization signal block pattern, a method of identifying an actually transmitted synchronization signal block by a terminal may be defined as follows.

Figure 15:
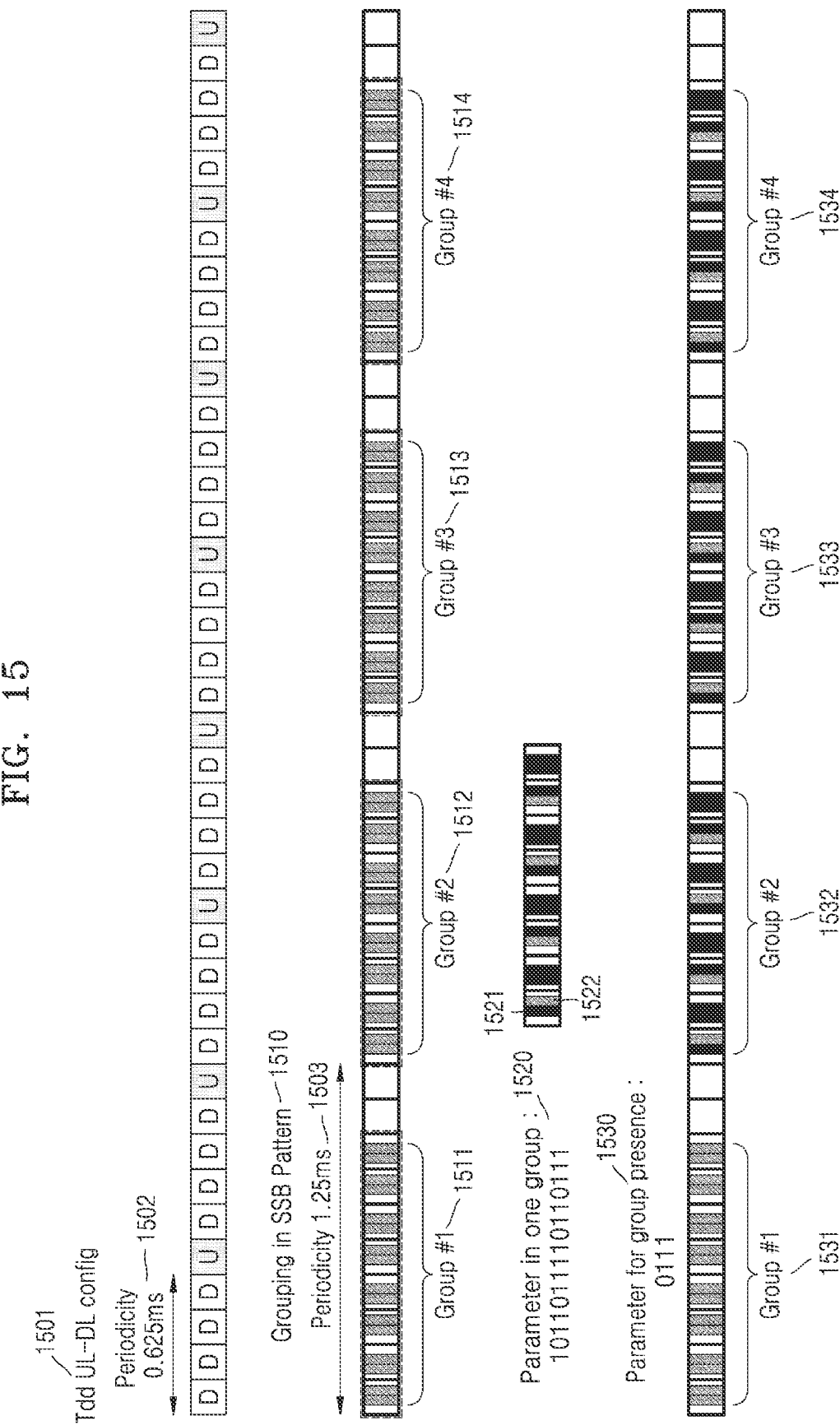
FIG. 15 is a diagram illustrating a method of identifying an actually transmitted synchronization signal block according to some embodiments of the disclosure.

1) A first method of identifying actually transmitted synchronization signal block indication information: a total of $N_{ssb}$+$N_g$ bits, i.e., $N_{ssb}$ bits indicating whether $N_{ssb}$ synchronization signal blocks of one group is transmitted and $N_g$ bits indicating the presence or absence of $N_g$ groups, may be used. With respect to the $N_{ssb}$ synchronization signal blocks of one group, 1 bit may indicate whether one synchronization signal block is transmitted. FIG. 15 is an example of the first method of determining/identifying actually transmitted synchronization signal block indication information according to the first embodiment of the disclosure. It may indicate that a base station transmits a first synchronization signal block of a group when a first MSB is 1 (1521) and does not actually transmit a second synchronization signal block of the group when a second MSB is 0 (1522). $N_g$ bits indicating the presence or absence of $N_g$ groups may indicate that when the first MSB is 0, all $N_{ssb}$ synchronization signal blocks of a first group are not transmitted (1531). It may indicate that when a second MSB is 1, $N_{ssb}$ synchronization signal blocks of a second group are transmitted in a transmission pattern 1520 of $N_g$ consecutive synchronization signal blocks in one group (1532).

For example, when $N_{ssb}$=16 and $N_g$=4, 16 bits indicating whether sixteen synchronization signal blocks of one group are transmitted and 4 bits indicating the presence or absence of four groups, i.e., a total of 20 bits, may be used. With respect to sixteen synchronization signal blocks in one group, 1 bit may indicate whether or not one synchronization signal block is transmitted. It may indicate that a first synchronization signal block with an index of 1 is not transmitted from the base station when a first MSB is 0, and is actually transmitted from the base station when the first MSB is 0. 4 bits indicating the presence or absence of four groups may indicate that all sixteen synchronization signal blocks of the first group are not transmitted (1531) when the first MSB is 0 (1531). It may indicate that when a second MSB is 1 (1532), sixteen synchronization signal blocks of a second group are transmitted in the transmission pattern 1520 of four consecutive synchronization signal blocks in one group (1532).

2) A second method of identifying actually transmitted synchronization signal block indication information: a total of 8 bits+$N_g$ bits, i.e., 8 bits indicating whether $N_{ssb}$ synchronization signal blocks of one group is transmitted and $N_g$ bits indicating the presence or absence of $N_g$ groups, may be used. With respect to the $N_{ssb}$ synchronization signal blocks of one group, 1 bit may indicate whether the $N_{ssb}$/eight synchronization signal blocks are transmitted. FIG. 16 is an example of the second method of identifying actually transmitted a synchronization signal block according to the first embodiment of the disclosure. It may indicate that $N_{ssb}$/eight consecutive synchronization signal blocks with indexes of 1 to $N_{ssb}$/8 are actually transmitted from a base station when a first MSB is 1 (1621), and are not transmitted from the base station when the first MSB is 0. It may indicate that $N_{ssb}$/eight consecutive synchronization signal blocks with indexes of $N_{ssb}$/8+1 to 2*$N_{ssb}$/8 are not transmitted from the base station when a second MSB is 0 (1622), and are actually transmitted from the base station when the second MSB is 1. $N_g$ bits indicating the presence or absence of $N_g$ groups may indicate that when the first MSB is 0, all $N_{ssb}$ synchronization signal blocks of a first group are not transmitted (1631). It may indicate that when a second MSB is 1, $N_{ssb}$ synchronization signal blocks of a second group are transmitted in a transmission pattern 1620 of $N_g$ consecutive synchronization signal blocks in one group (1632).

For example, when $N_{ssb}$=16 and $N_g$=4, 8 bits indicating whether sixteen synchronization signal blocks of one group are transmitted and 4 bits indicating the presence or absence of four groups, i.e., a total of 12 bits, may be used. With respect to sixteen synchronization signal blocks in one group, 1 bit may indicate whether two synchronization signal blocks are transmitted. It may indicate that two consecutive synchronization signal blocks with indexes 1 and 2 are not transmitted from the base station when a first MSB (1621) is 0 and are actually transmitted from the base station when the first MSB (1621) is 1. It may indicate that two consecutive synchronization signal blocks 1622 with indexes 3 and 4 are not transmitted from the base station when a second MSB (1622) is 0 and are actually transmitted from the base station when the second MSB (1622) is 1. 4 bits indicating the presence or absence of four groups may indicate that all sixteen synchronization signal blocks of a first group are not transmitted (1631) when the first MSB is 0. It may indicate that when a second MSB is 1, sixteen synchronization signal blocks of a second group are transmitted in the transmission pattern 1620 of four consecutive synchronization signal blocks in one group (1632).

Figure 17:
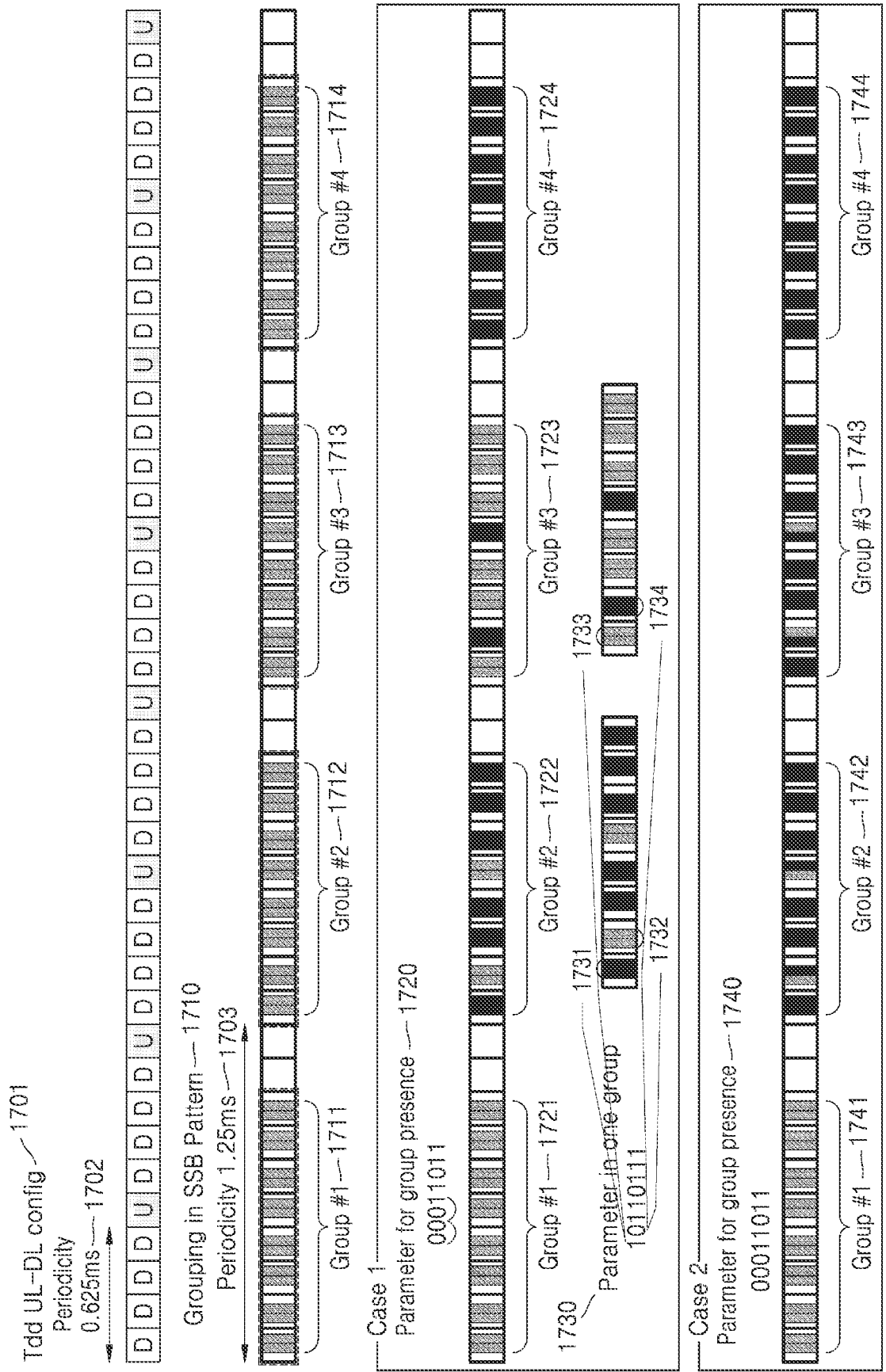
FIG. 17 is a diagram illustrating a method of identifying an actually transmitted synchronization signal block according to some embodiments of the disclosure.

3) A third method of identifying actually transmitted synchronization signal block indication information: a total of 16 bits, i.e., 8 bits indicating a pattern of $N_{ssb}$ synchronization signal blocks of one group and 8 bits indicating $N_g$ bits indicating the interpretation of a pattern in each of the $N_g$ groups, may be used. In this case, with respect to the pattern of the $N_{ssb}$ synchronization signal blocks of one group, 1 bit corresponds to the $N_{ssb}$/eight synchronization signal blocks. In the 8 bits indicating the interpretation of the pattern in the $N_g$ groups, an 8-bit pattern representing the pattern of the $N_{ssb}$ synchronization signal blocks of the one group may be differently interpreted according to 8/$N_g$ bits. FIG. 17 illustrates an example of the third method of identifying actually transmitted synchronization signal block indication information according to the first embodiment of the disclosure. For example, when $N_{ssb}$=16 and $N_g$=4, in 8 bits representing the interpretation of patterns in four groups, whether sixteen synchronization signal blocks of one group are transmitted may be differently interpreted according to 2 bits. When a first MSB and a second MSB are 00 (1721), the pattern in a first group may be interpreted as follows. It may be interpreted that in 8 bits indicating a pattern of sixteen synchronization signal blocks, both 0 and 1 indicate that two consecutive synchronization signal blocks are not transmitted from the base station (1721). When bits indicating the interpretation of a pattern in a second group are 01 (1722), a pattern in a first group may be interpreted as follows. It may indicate that in 8 bits indicating a pattern of sixteen synchronization signal blocks, 0 indicates that two consecutive synchronization signal blocks 1732 are not transmitted from a base station and 1 indicates that the two consecutive synchronization signal blocks 1731 are transmitted from the base station (1722). When bits indicating the interpretation of a pattern in a group are 10 (1723), the pattern in the group may be interpreted as follows. It may indicate that in 8 bits indicating a pattern of sixteen synchronization signal blocks, 0 indicates that two consecutive synchronization signal blocks are transmitted (1734) from the base station and 1 indicates that the two consecutive synchronization signal blocks are not transmitted (1733) from the base station. When bits indicating the interpretation of a pattern in a first group are 11 (1724), the pattern in the first group may be interpreted as follows. It may be interpreted that in 8 bits indicating a pattern of sixteen synchronization signal blocks, both 0 and 1 indicate that two consecutive synchronization signal blocks are transmitted from the base station (1724). An example of a method of differently interpreting, according to 2 bits, an 8-bit pattern indicating the pattern of the sixteen synchronization signal blocks of the one group is as shown in Table 1 below. Table 1 shows an example of a method of interpreting a synchronization signal block pattern.

blocks in one group are set, based on a period of the UL-DL configuration and periods of time resources agreed between the base station and the terminal to transmit synchronization signal blocks. When the number $N_g$ of groups configured in operation 1801 is greater than 8 (1803), synchronization signal block information to be notified to the terminal is determined according to a first method of identifying an actually transmitted synchronization signal block, in which $N_g=8$ and $N_{ssb}=8$. When $N_g$ is less than 8 (1804), synchronization signal block information to be notified to the terminal may be determined by applying a predetermined method from among first to third methods of determining an actually transmitted synchronization signal block.

Figure 19:
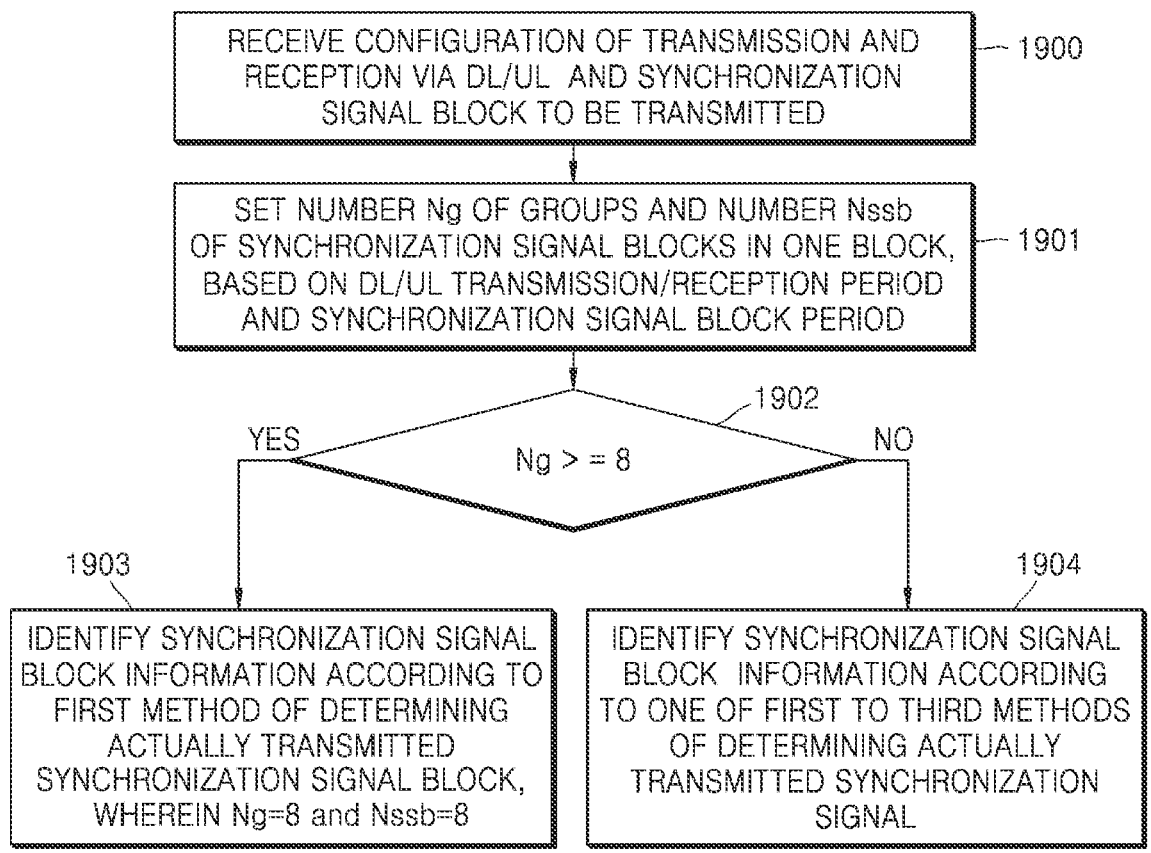
FIG. 19 is a flowchart of a process of identifying actually transmitted synchronization signal block indication information by a terminal according to some embodiments of the disclosure.

FIG. 19 illustrates a process of identifying actually transmitted synchronization signal block indication information by a terminal, according to the first embodiment of the disclosure. In operation 1900, the terminal may receive an UL-DL configuration and transmitted synchronization signal block information through system information. In operation 1901, the number $N_g$ of groups and the number $N_{ssb}$ of synchronization signal blocks in one group are set, based on periods of UL-DL configuration slots included in the UL-DL configuration and periods of time resources agreed between a base station and the terminal to transmit synchronization signal blocks. When the number $N_g$ of groups configured in

TABLE 1

| Two groupPresense bits | Case#1 (0 in inOneGroup, 1 in inOneGroup) | Case#2 (0 in inOneGroup, 1 in inOneGroup) |
| --- | --- | --- |
| 00 | 0: corresponding 2 SSBs are not transmitted 1: corresponding 2 SSBs are not transmitted | 0: corresponding 2 SSBs are not transmitted 1: corresponding 2 SSBs are not transmitted |
| 01 | 0: corresponding 2 SSBs are not transmitted 1: corresponding 2 SSBs are transmitted | 0: first SSB are not transmitted, second SSB are transmitted 1: corresponding 2 SSBs are transmitted |
| 10 | 0: corresponding 2 SSBs are transmitted 1: corresponding 2 SSBs are not transmitted | 0: first SSB are transmitted, second SSB are not transmitted 1: corresponding 2 SSBs are transmitted |
| 11 | 0: corresponding 2 SSBs are transmitted 1: corresponding 2 SSBs are transmitted | 0: corresponding 2 SSBs are transmitted 1: corresponding 2 SSBs are transmitted |

A second method 1740 of differently interpreting, according to 2 bits, an 8-bit pattern representing a pattern of sixteen synchronization signal blocks of one group is suitable when most synchronization signal blocks in one group are to be transmitted.

Figure 18:
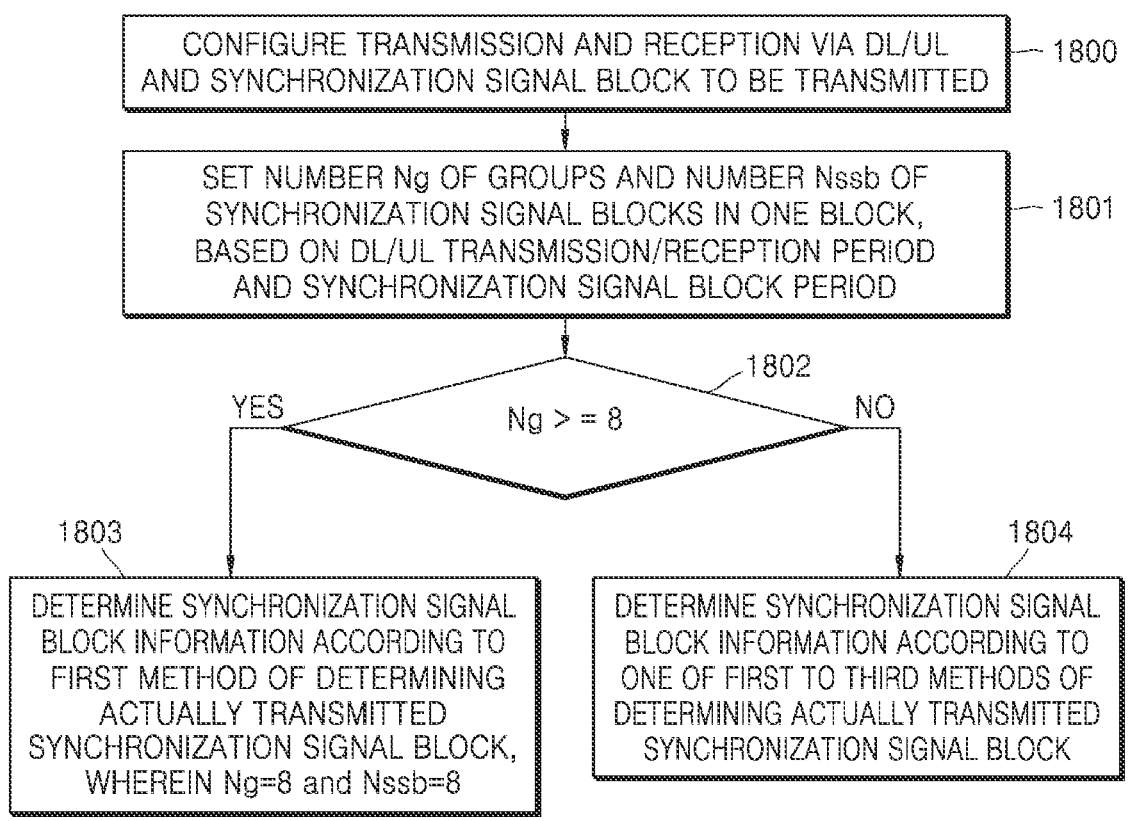
FIG. 18 is a flowchart of a process of determining actually transmitted synchronization signal block indication information by a base station, according to some embodiments of the disclosure.

FIG. 18 illustrates a process of determining actually transmitted synchronization signal block indication information by a base station, according to the first embodiment of the disclosure. In operation 1800, the base station may configure an UL-DL configuration and a synchronization signal block to be transmitted. The UL-DL configuration may include information indicating whether each of slots is a downlink/uplink/flexible slot, periods of the indicated slots, and information, such as a subcarrier spacing, which is a criterion for the periods. The synchronization signal block indication information may indicate which resource is to be used for transmission from among resources agreed between the base station and a terminal. The configured UL-DL configuration information and synchronization signal block indication information are notified to the terminal through system information. In operation 1801, the number $N_g$ of groups and the number $N_{ssb}$ of synchronization signal operation 1901 is greater than 8 (1903), the terminal identifies an actually transmitted synchronization signal block according to a first method of identifying an actually transmitted synchronization signal block, in which $N_g=8$ and $N_{ssb}=8$. When $N_g$ is less than 8 (1904), the terminal may identify the actually transmitted synchronization signal block by applying a predetermined method from among first to third methods of determining an actually transmitted synchronization signal block.

Second Embodiment

A second embodiment of the disclosure provides a method of identifying synchronization signal block indication information by a terminal, based on the number of synchronization signal blocks corresponding to one slot from an UL-DL configuration received from a base station through system information. The synchronization signal block indication information may be identified in consideration of how many synchronization signal blocks to which a slot is allocated according to a subcarrier spacing to which the UL-DL configuration is allocated. One slot of the UL-DL configuration allocated with a subcarrier spacing of SCS1 kHz in a frequency band of 6 GHz or more may correspond to 2*SCS2/SCS1 synchronization signal blocks configured with the subcarrier spacing of SCS2 kHz. A method of identifying an actually transmitted synchronization signal block by the terminal, based on the subcarrier spacing of the UL-DL configuration and the subcarrier spacing of the synchronization signal block may be defined as follows.

Figure 20:
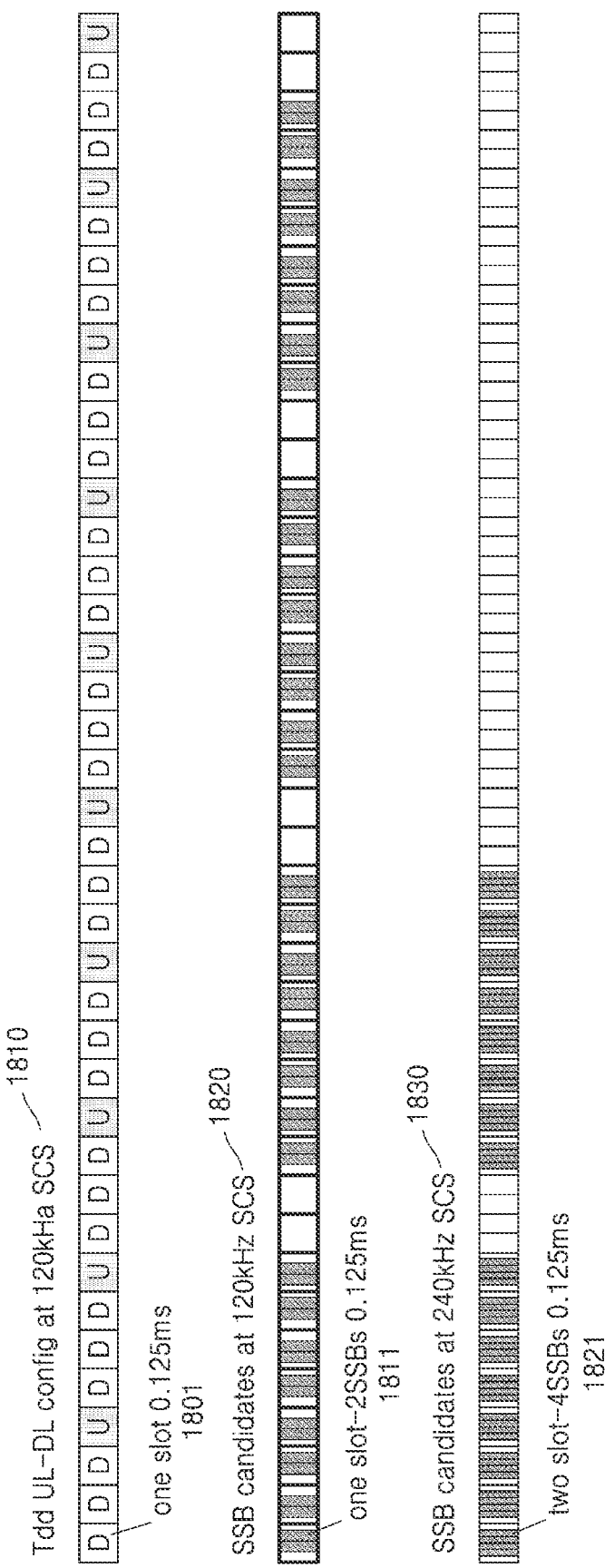
FIG. 20 is a diagram illustrating the number of synchronization signal blocks according to some embodiments of the disclosure.

1) A fourth method of identifying actually transmitted synchronization signal block indication information: when a certain slot is configured as an uplink through an UL-DL configuration, 2*SCS2/SCS1 synchronization signal blocks cannot be transmitted. In this case, the number of synchronization signal blocks in one group is defined as $N_{ssb}$=2*SCS2/SCS1, and a total of 64 synchronization signal blocks are divided into $N_g$=32*SCS1/SCS2 groups. Accordingly, in order to indicate whether up to 64 synchronization signal blocks are transmitted, 1 bit represents 2*SCS2/SCS1 synchronization signal blocks and thus the presence or absence of each group may be indicated with a total of $N_g$ bits. FIG. 20 illustrates an example of the number of synchronization signal blocks corresponding to one slot in an UL-DL configuration. When the uplink-downlink configuration is allocated at a subcarrier spacing of 120 kHz (2010), one slot corresponds to $N_{ssb}$(=2) synchronization signal blocks transmitted at the subcarrier spacing 2020 of 120 kHz (2011) and corresponds to $N_{ssb}$(=4) synchronization signal blocks transmitted at a subcarrier spacing 2030 of 240 kHz (2021). Accordingly, 1 bit may indicate whether $N_{ssb}$ synchronization signal blocks are transmitted, and whether a total of 64 synchronization signal blocks are transmitted may be indicated with $N_g$ bits. In detail, when 1 bit indicates whether $N_{ssb}$(=4) synchronization signal blocks are transmitted, it may indicate that four consecutive synchronization signal blocks are not transmitted when the 1 bit is 0 and are transmitted when the 1 bit is 1. Accordingly, whether a total of sixty-four synchronization signal blocks are transmitted or not may be indicated with $N_g$(=16) bits.

Figure 21:
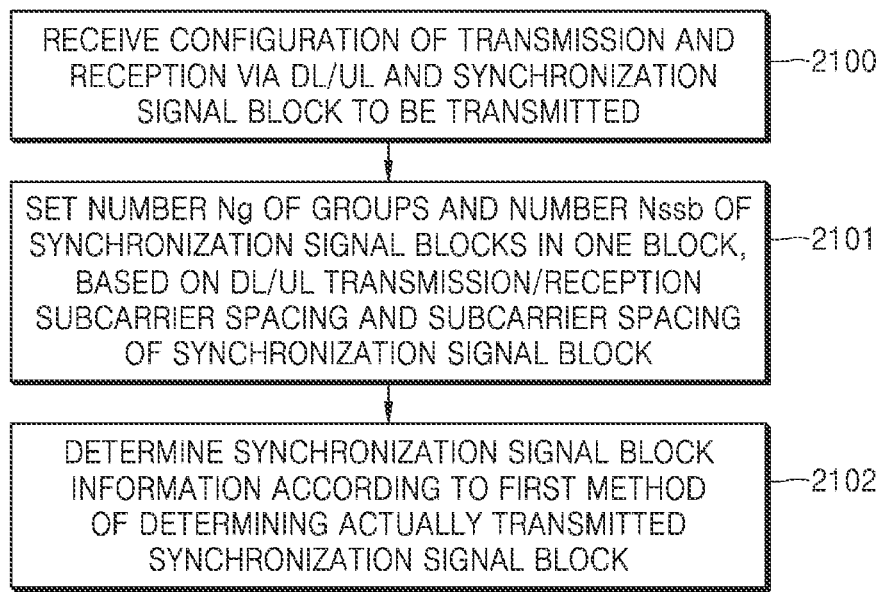
FIG. 21 is a flowchart of a process of determining actually transmitted synchronization signal block indication information by a base station, according to some embodiments of the disclosure.

FIG. 21 is a flowchart of a process of determining actually transmitted synchronization signal block indication information by a base station, according to the second embodiment of the disclosure. In operation 2100, the base station may configure an UL-DL configuration and a synchronization signal block to be transmitted. The UL-DL configuration may include information indicating whether each of slots is a downlink/uplink/flexible slot, periods of the indicated slots, and information, such as a subcarrier spacing, which is a criterion for the periods. The synchronization signal block indication information may indicate which resource is to be used for transmission among resources agreed between the base station and a terminal. The configured UL-DL configuration information and synchronization signal block indication information are notified to the terminal through system information. In operation 2101, the number $N_{ssb}$(=2*SCS2/SCS1) of synchronization signal blocks corresponding to one slot at an uplink-downlink and the number $N_g$(=32*SCS1/SCS2) of groups are determined, based on a subcarrier spacing of SCS1 kHz of the UL-DL configuration and a subcarrier spacing of SCS2 kHz at which a synchronization signal block is transmitted. Lastly, in operation 2102, synchronization signal block information to be notified to the terminal may be determined with $N_g$ bits according to the fourth method of determining actually transmitted synchronization signal block indication information.

Figure 22:
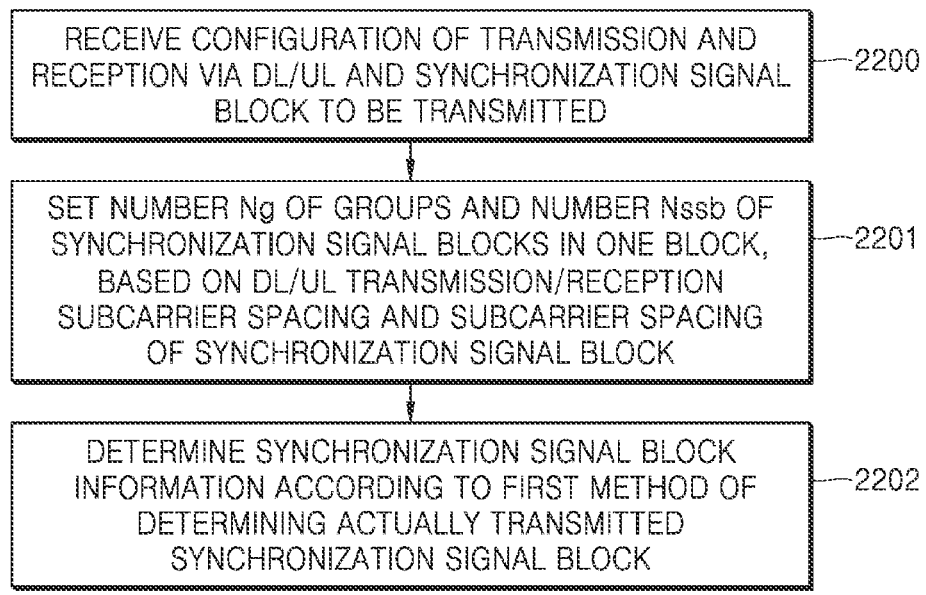
FIG. 22 is a flowchart of a process of identifying actually transmitted synchronization signal block indication information by a terminal, according to some embodiments of the disclosure.

FIG. 22 illustrates a process of identifying actually transmitted synchronization signal block indication information by a terminal, according to the second embodiment of the disclosure. In operation 2200, the terminal may receive an UL-DL configuration and synchronization signal block indication information through system information. In operation 2201, the number $N_{ssb}$(=2*SCS2/SCS1) of synchronization signal blocks corresponding to one slot at an uplink-downlink and the number $N_g$(=32*SCS1/SCS2) of groups are determined, based on a subcarrier spacing of SCS1 kHz of the UL-DL configuration and a subcarrier spacing of SCS2 kHz at which a synchronization signal block is transmitted. Lastly, in operation 2102, an actually synchronization signal block may be identified with $N_9$ bits according to the fourth method of determining actually transmitted synchronization signal block indication information.

Third Embodiment

A third embodiment of the disclosure provides a method of identifying, by a terminal, a synchronization signal block transmission pattern received through system information, based on an UL-DL configuration received from a base station through the system information. As described above, because there is a limit in synchronization signal block transmission information and the UL-DL configuration, the terminal identifies transmission of a synchronization signal block received based on the system information, and identifies again the transmission of the synchronization signal block according to the UL-DL configuration.

Figure 23:
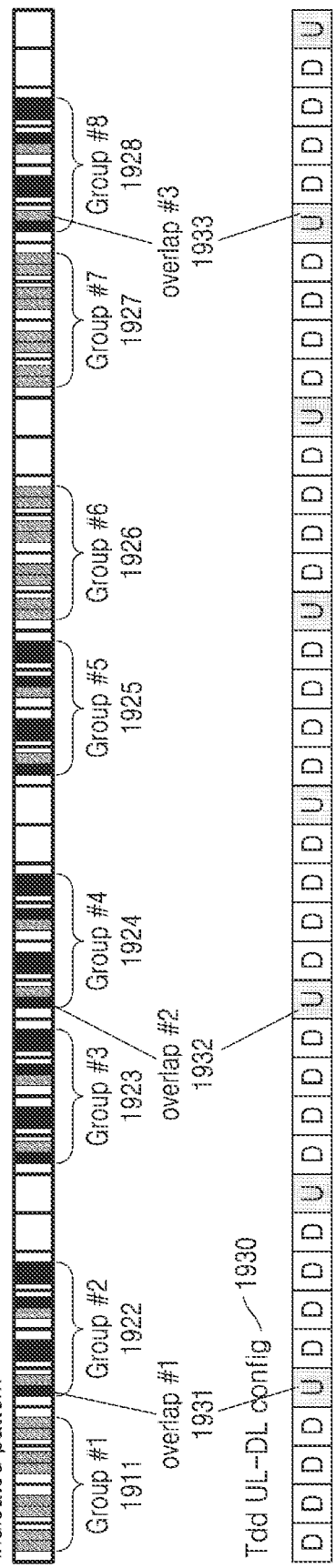
FIG. 23 is a diagram illustrating a method of identifying an actually transmitted synchronization signal block according to some embodiments of the disclosure.

1) A fifth method of identifying actually transmitted synchronization signal block indication information: transmission of a synchronization signal block is identified based on information transmitted through system information, and it is determined that according to an UL-DL configuration, the synchronization signal block is transmitted when a slot in which the synchronization signal block has been transmitted indicates a downlink and is not transmitted when the slot indicates an uplink. FIG. 23 illustrates an example of a method of identifying transmission of a synchronization signal block according to an UL-DL configuration in a slot in which the synchronization signal block is transmitted, according to the third embodiment of the disclosure. When a synchronization signal block is transmitted at a subcarrier spacing of 120 kHz, as described above, whether a total of 64 synchronization signal blocks are transmitted may be represented through system information with 8 bits 2310 indicating whether synchronization signal blocks in one group are transmitted and 8 bits 2320 indicating whether each group is transmitted. Through the system information, the terminal may identify whether 64 synchronization signal blocks are transmitted by using the 8 bits indicating whether the synchronization signal blocks in the group are transmitted as one pattern 2310 and the 8 bits 2320 indicating whether each group is transmitted. Thereafter, the terminal may determine that a synchronization signal block is to not be transmitted in the slot for which the uplink is indicated according to the UL-DL configuration 2330. For example, the terminal may determine that a synchronization signal block is to not be transmitted in a 5th slot 2331, a 15th slot 2332, and a 35th slot 2333 overlapping the slot for which the uplink is indicated according to the UL-DL configuration 2330 and the slot in which it is determined that the synchronization signal block is transmitted (2320), and may identify an actually transmitted synchronization signal block 2340.

Figure 24:
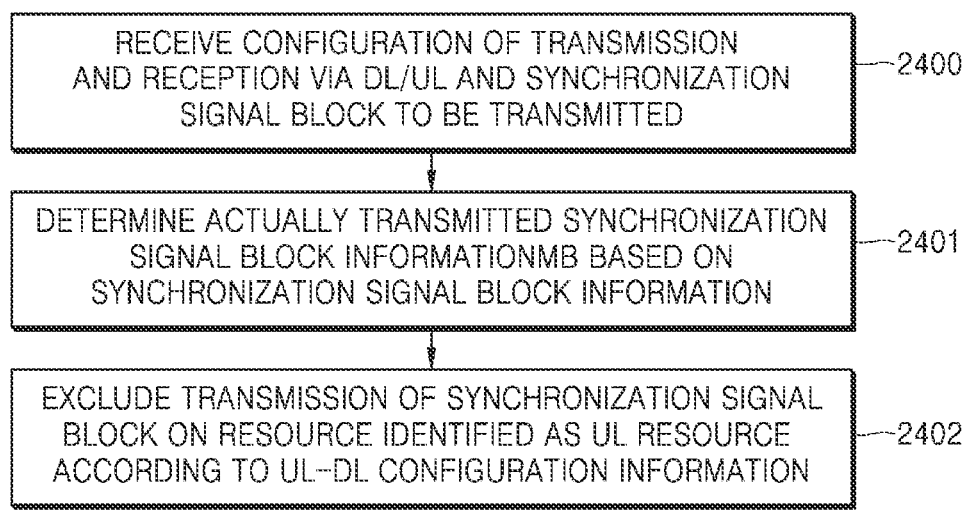
FIG. 24 is a flowchart of a process of identifying actually transmitted synchronization signal block indication information by a terminal, according to some embodiments of the disclosure.

FIG. 24 illustrates a process of identifying actually transmitted synchronization signal block indication information by a terminal, according to the third embodiment of the disclosure. In operation 2400, the terminal may receive UL-DL configuration information and transmitted synchronization signal block indication information through system information. In operation 2401, it may be determined which resource on which the synchronization signal block indication information is to be transmitted among time resources agreed between a base station and the terminal. In operation 2402, the terminal determines that a synchronization signal block is to not be transmitted on a resource determined as an uplink resource according to the uplink-downlink configuration information. Here, an order of operations 2401 and 2402 is not limited and operations 2401 and 2402 may be performed in a different order.

Figure 25:
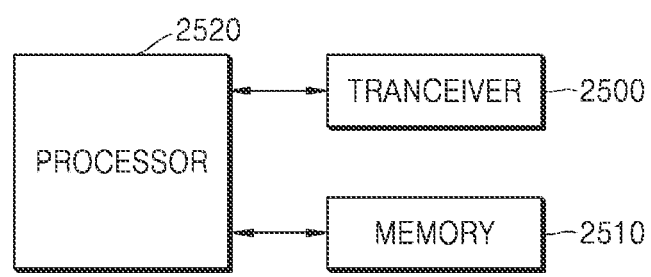
FIG. 25 is a block diagram illustrating a configuration of a base station according to embodiments of the disclosure.

Specifically, FIG. 25 is a block diagram illustrating an internal configuration of a base station according to an embodiment of the disclosure. As illustrated in FIG. 25, the base station of the disclosure may include a transceiver 2500, a memory 2510, and a processor 2520. However, embodiments are not limited thereto, and the base station may include fewer or more components than the components illustrated in FIG. 25.

The transceiver 2500 may transmit signals to and receive signals from a terminal. The signals transmitted to and received from the terminal may include control information and data. To this end, the transceiver 2500 may include a radio-frequency (RF) transmitter that up-converts and amplifies a frequency of a signal to be transmitted, an RF receiver that low-noise amplifies a received signal and down-converts a frequency of the signal, and the like. However, the configuration of the transceiver 2500 is not limited thereto. The transceiver 2500 may receive a signal and output the signal to the processor 2520 through a radio channel, and transmit a signal output from the processor 2520 through the radio channel. The processor 2520 may control a series of processes to operate the base station according to the above-described embodiments of the disclosure. For example, the processor 2520 may receive a data signal including a control signal transmitted from a terminal through the transceiver 2500, and identify a result of receiving the control signal and the data signal transmitted from the terminal. As another example, the processor 2520 may calculate and determine synchronization signal block indication information and the UL-DL configuration information. For a concrete example, the processor 2520 may define the synchronization signal block indication information in advance or may change the synchronization signal block indication information, based on the UL-DL configuration information, an actually transmitted synchronization signal block, and the like. The UL-DL configuration information and the synchronization signal block indication information may be transmitted in the system information through the transceiver 2500. In addition, the base station may receive a PRACH transmitted from a terminal through the transceiver 2500 in a PRACH transmission resource region determined according to the synchronization signal block indication information.

The memory 2510 stores data, such as a basic program, an application program, and configuration information, for operation of the base station. The memory 2510 may store information about a bearer allocated to a connected terminal, a measurement result reported from the connected terminal, and the like. The memory 2510 may further store information serving as a criterion for determining whether to provide dual conductivity to the terminal or to stop the dual conductivity. In addition, the memory 2510 provides the stored data in response to a request from the processor 2520. The memory 2510 may include a storage medium, such as a ROM, a RAM, a hard disk, a CD-ROM, and a DVD, or a combination of such storage media. A plurality of memories 2510 may be provided. According to some embodiments of the disclosure, the memory 2510 may store a program for identifying a transmitted synchronization signal block according to the disclosure, and the processor 2520 may perform the above-described embodiments, based on the program stored in the memory 2510. The components of the base station may be implemented in the form of a single chip.

Figure 26:
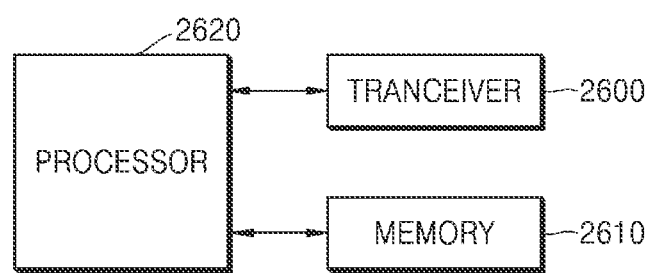
FIG. 26 is a block diagram illustrating a configuration of a terminal according to embodiments of the disclosure.

FIG. 26 is a block diagram illustrating an internal configuration of a terminal according to embodiments of the disclosure. As illustrated in FIG. 26, the terminal of the disclosure may include a transceiver 2600, a memory 2610, and a processor 2620. The transceiver 2600 may transmit signals to and receive signals from a base station. The signals transmitted to and received from the base station may include control information and data. To this end, the transceiver 2600 may include an RF transmitter that up-converts and amplifies a frequency of a signal to be transmitted, an RF receiver that low-noise amplifies a received signal and down-converts a frequency of the signal, and the like. However, embodiments are not limited to the above examples. The transceiver 2600 may receive a signal and output the signal to the processor 2520 through a radio channel, and transmit a signal output from the processor 2620 through the radio channel. The processor 2620 may control a series of processes to operate the terminal according to the above-described embodiments of the disclosure. For example, the transceiver 2600 may receive a data signal including a control signal, and the processor 2620 may determine a reception result of the data signal. Thereafter, when a first-signal reception result including the received data signal is to be transmitted to the base station at the timing, the transceiver 2600 transmits the first-signal reception result to the base station at a timing determined by the processor 2620. As another example, when the transceiver 2600 receives system information, including UL-DL configuration information and synchronization signal block indication information, from the base station, the processor 2620 may determine positions of actually transmitted synchronization signal blocks and reset or change time or a period of reception of the synchronization signal blocks by the terminal, and the transceiver 2600 may receive the synchronization signal blocks transmitted from the base station. In addition, the processor 2620 may determine time-domain allocation information of a PRACH to be transmitted to the base station according to the received synchronization signal blocks.

The memory 2610 stores data, such as a basic program, an application program, and configuration information, for operation of the terminal. In particular, the memory 2610 provides the stored data in response to a request from the processor 2620. The memory 2610 may include a storage medium, such as a ROM, a RAM, a hard disk, a CD-ROM, and a DVD, or a combination of such storage media. A plurality of memories 2610 may be provided. According to some embodiments of the disclosure, the memory 2610 may store a program for identifying a transmitted synchronization signal block according to the disclosure, and the processor 2620 may perform the above-described embodiments, based on the program stored in the memory 2610. The components of the terminal may be implemented in the form of a single chip.

The methods according to the embodiments of the disclosure described in the claims or specification of the disclosure may be implemented by hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments of the disclosure set forth in the claims or specification.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks such as the Internet, an Intranet, a local area network (LAN), a wide LAN (WLAN) or a storage area network (SAN) or a combination thereof. Such a storage device may be connected to a device performing embodiments of the disclosure through an external port. In addition, a separate storage device in a communication network may be connected to a device that performs embodiments of the disclosure.

In the embodiments of the disclosure described above, each component included in the disclosure is expressed in a singular or plural form according to a presented embodiment of the disclosure. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

Although embodiments of the disclosure have been described in the detailed description of the disclosure, various modifications may be made therein without departing from the scope of the disclosure. Therefore, the scope of the disclosure is not limited to the embodiments of the disclosure described herein and should be defined by the claims and their equivalents. That is, it will be obvious to those of ordinary skill in the art that other modified examples based on the technical spirit of the disclosure may be implemented. These embodiment of the disclosure may be implemented in combination as necessary. For example, part of the methods suggested in the disclosure may be combined with each other to operate a base station and a terminal. The above-described embodiments of the disclosure have been presented with respect to 5G and NR systems but other modified examples based on the technical idea of the embodiments of the disclosure may be implemented in other systems such as LTE, LTE-A, LTE-A-Pro systems.

Although embodiments of the disclosure are set forth in the present specification and drawings and specific terms are used herein, they are merely provided in a general sense to easily explain the technical idea of the disclosure and help understanding of the disclosure and are not intended to limit the scope of the disclosure. It will be obvious to those of ordinary skill in the art that other modified examples based on the technical spirit of the disclosure can be implemented. These embodiment of the disclosure may be implemented in combination as necessary.

The invention claimed is:

1. A method, performed by a base station, of providing synchronization signal block indication information in a wireless communication system, the method comprising:
    configuring the synchronization signal block indication information, based on information regarding an uplink-downlink slot configuration and a ratio between a subcarrier spacing at which the synchronization signal block is transmitted and a subcarrier spacing to which the uplink-downlink slot configuration is allocated;
    transmitting the configured synchronization signal block indication information to a terminal; and
    transmitting at least one synchronization signal block, based on the configured synchronization signal block indication information,
    wherein a plurality of synchronization signal blocks to be transmitted in a full frame are divided into at least one group, based on the ratio between the subcarrier spacing at which the synchronization signal block is transmitted in the full frame and the subcarrier spacing to which the uplink-downlink slot configuration is allocated,
    wherein the plurality of synchronization signal blocks to be transmitted in a half frame are divided into the at least one group, based on a repetition period of the uplink-downlink slot configuration and a repetition period of a pattern of a slot in which the at least one synchronization signal block is transmitted in the full frame, and
    wherein the synchronization signal block indication information includes a first type information bit indicating whether each of the at least one group is transmitted and a second type information bit indicating whether synchronization signal blocks corresponding to each of the at least one group is transmitted.

2. A method, performed by a terminal, of providing a synchronization signal block in a wireless communication system, the method comprising:
    receiving information regarding an uplink-downlink slot configuration and synchronization signal block indication information from a base station;
    identifying the synchronization signal block indication information, based on information regarding the uplink-downlink slot configuration and a ratio between a subcarrier spacing at which the synchronization signal block is transmitted and a subcarrier spacing to which the uplink-downlink slot configuration is allocated; and
    receiving at least one synchronization signal block, based on the identified synchronization signal block indication information,
    wherein a plurality of synchronization signal blocks to be transmitted in a full frame are divided into at least one group, based on the ratio between the subcarrier spacing at which the synchronization signal block is transmitted in the full frame and the subcarrier spacing to which the uplink-downlink slot configuration is allocated,
    wherein the plurality of synchronization signal blocks to be transmitted in a half frame are divided into the at least one group, based on a repetition period of the uplink-downlink slot configuration and a repetition period of a pattern of a slot in which the at least one synchronization signal block is transmitted in the full frame, and wherein the synchronization signal block indication information includes a first type information bit indicating whether each of the at least one group is transmitted and a second type information bit indicating whether synchronization signal blocks corresponding to each of the at least one group is transmitted.

3. A base station which provides synchronization signal block indication information in a wireless communication system, the base station comprising:

a transceiver; and a controller coupled to the transceiver and configured to:

configure the synchronization signal block indication information, based on information regarding an uplink-downlink slot configuration and a ratio between a subcarrier spacing at which the synchronization signal block is transmitted and a subcarrier spacing to which the uplink-downlink slot configuration is allocated, transmit the configured synchronization signal block indication information to a terminal, and transmit at least one synchronization signal block, based on the configured synchronization signal block indication information, wherein a plurality of synchronization signal blocks to be transmitted in a full frame are divided into at least one group, based on the ratio between the subcarrier spacing at which the synchronization signal block is transmitted in the full frame and the subcarrier spacing to which the uplink-downlink slot configuration is allocated, wherein the plurality of synchronization signal blocks to be transmitted in a half frame are divided into the at least one group, based on a repetition period of the uplink-downlink slot configuration and a repetition period of a pattern of a slot in which the at least one synchronization signal block is transmitted in the full frame, and wherein the synchronization signal block indication information includes a first type information bit indicating whether each of the at least one group is transmitted and a second type information bit indicating whether synchronization signal blocks corresponding to each of the at least one group is transmitted.

4. A terminal which receives a synchronization signal block in a wireless communication system, the terminal comprising:

a transceiver; and a controller coupled to the transceiver and configured to:

receive information regarding an uplink-downlink slot configuration and synchronization signal block indication information from a base station, identify the synchronization signal block indication information, based a ratio between a subcarrier spacing at which the synchronization signal block is transmitted and a subcarrier spacing to which the uplink-downlink slot configuration is allocated from the base station and the information regarding the uplink-downlink slot configuration, and receive at least one synchronization signal block, based on the identified synchronization signal block indication information, wherein a plurality of synchronization signal blocks to be transmitted in a full frame are divided into at least one group, based on the ratio between the subcarrier spacing at which the synchronization signal block is transmitted in the full frame and the subcarrier spacing to which the uplink-downlink slot configuration is allocated, wherein the plurality of synchronization signal blocks to be transmitted in a half frame are divided into the at least one group, based on a repetition period of the uplink-downlink slot configuration and a repetition period of a pattern of a slot in which the at least one synchronization signal block is transmitted in the full frame, and wherein the synchronization signal block indication information includes a first type information bit indicating whether each of the at least one group is transmitted and a second type information bit indicating whether synchronization signal blocks corresponding to each of the at least one group is transmitted.

* * * * *